US009111285B2

(12) United States Patent
Amidon et al.

(10) Patent No.: US 9,111,285 B2
(45) Date of Patent: Aug. 18, 2015

(54) SYSTEM AND METHOD FOR REPRESENTING CONTENT, USER PRESENCE AND INTERACTION WITHIN VIRTUAL WORLD ADVERTISING ENVIRONMENTS

(75) Inventors: Christopher Amidon, Apex, NC (US); Gregory Evans, Raleigh, NC (US); Richard Walsh, Raleigh, NC (US); Alfredo Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2143 days.

(21) Appl. No.: 11/845,499

(22) Filed: Aug. 27, 2007

(65) Prior Publication Data

US 2009/0063983 A1 Mar. 5, 2009

(51) Int. Cl.
*G06F 3/048* (2013.01)
*G06Q 30/02* (2012.01)
*G06N 3/00* (2006.01)

(52) U.S. Cl.
CPC ............... *G06Q 30/02* (2013.01); *G06N 3/006* (2013.01)

(58) Field of Classification Search
USPC .......................................... 715/757, 751, 706
See application file for complete search history.

(56) References Cited

U.S. PATENT DOCUMENTS

| | | | |
|---|---|---|---|
| 4,775,935 A | 10/1988 | Yourick | |
| 5,534,911 A | 7/1996 | Levitan | |
| 5,557,721 A | 9/1996 | Fite et al. | |
| 5,736,982 A | 4/1998 | Suzuki et al. | |
| 5,740,549 A | 4/1998 | Reilly et al. | |
| 5,754,939 A | 5/1998 | Herz et al. | |
| 5,794,210 A | 8/1998 | Goldhaber et al. | |
| 5,855,008 A | 12/1998 | Goldhaber et al. | |

(Continued)

FOREIGN PATENT DOCUMENTS

| | | |
|---|---|---|
| EP | 1 190 579 B1 | 6/2000 |
| EP | 1 162 840 A2 | 6/2001 |

(Continued)

OTHER PUBLICATIONS

No Author, "Advertisement Bidding System and Method," (article), date unknown, 20 pages, http://www.priorartdatabase.com/IPCOM/000138556.

(Continued)

*Primary Examiner* — Thanh Vu
(74) *Attorney, Agent, or Firm* — Withrow & Terranova, PLLC

(57) ABSTRACT

A control system renders a shared virtual environment to one or more users and obtains metadata associated with content accessed by the users. Representations based on the gathered metadata are provided to a viewing user, and may include visual elements serving as host, content and/or presence representations. Applicable representations are identified from a plurality of defined possible content representations based on the metadata associated with and obtained for a hosting user. The representations may be descriptive of a variety of parameters, including but not limited to the type, timing, nature or other parameters associated with content currently being accessed by a hosting user, content available from the hosting user, a future schedule for content access, time remaining for the hosting user to remain within a shared virtual environment, the hosting user's social network status relative to the viewing user. Presence representations may be displayed to provide information on a hosting user's presence availability within a shared virtual environment relative to one or more determined time slots.

26 Claims, 10 Drawing Sheets

(56) References Cited

U.S. PATENT DOCUMENTS

| | | | |
|---|---|---|---|
| 5,923,330 A | 7/1999 | Tarlton et al. | |
| 5,933,811 A | 8/1999 | Angles et al. | |
| 5,974,398 A | 10/1999 | Hanson et al. | |
| 6,025,837 A | 2/2000 | Matthews, III et al. | |
| 6,081,278 A | 6/2000 | Chen | |
| 6,167,441 A | 12/2000 | Himmel | |
| 6,182,808 B1 | 2/2001 | Walton et al. | |
| 6,240,555 B1 | 5/2001 | Shoff et al. | |
| 6,256,043 B1 | 7/2001 | Aho et al. | |
| 6,275,819 B1 | 8/2001 | Carter | |
| 6,311,194 B1 | 10/2001 | Sheth et al. | |
| 6,324,519 B1 | 11/2001 | Eldering | |
| 6,327,590 B1 | 12/2001 | Chidlovskii et al. | |
| 6,329,986 B1 | 12/2001 | Cheng | |
| 6,349,301 B1 | 2/2002 | Mitchell et al. | |
| 6,356,879 B2 | 3/2002 | Aggarwal et al. | |
| 6,389,409 B1 | 5/2002 | Horovitz et al. | |
| 6,453,294 B1 | 9/2002 | Dutta et al. | |
| 6,456,286 B1 | 9/2002 | Arai et al. | |
| 6,457,010 B1 | 9/2002 | Eldering et al. | |
| 6,463,433 B1 | 10/2002 | Baclawski | |
| 6,498,795 B1 | 12/2002 | Zhang et al. | |
| 6,545,682 B1 | 4/2003 | Ventrella et al. | |
| 6,553,367 B2 | 4/2003 | Horovitz et al. | |
| 6,560,578 B2 | 5/2003 | Eldering | |
| 6,580,811 B2 | 6/2003 | Maurer et al. | |
| 6,581,072 B1 | 6/2003 | Mathur et al. | |
| 6,610,105 B1 | 8/2003 | Martin, Jr. et al. | |
| 6,629,100 B2 | 9/2003 | Morris et al. | |
| 6,629,136 B1 | 9/2003 | Naidoo | |
| 6,672,961 B1 | 1/2004 | Uzun | |
| 6,701,362 B1 | 3/2004 | Subramonian et al. | |
| 6,725,259 B1 | 4/2004 | Bharat | |
| 6,738,764 B2 | 5/2004 | Mao et al. | |
| 6,758,746 B1 | 7/2004 | Hunter et al. | |
| 6,772,160 B2 | 8/2004 | Cho et al. | |
| 6,772,195 B1* | 8/2004 | Hatlelid et al. | 709/204 |
| 6,782,431 B1 | 8/2004 | Mukherjee et al. | |
| 6,795,972 B2 | 9/2004 | Rovira | |
| 6,820,277 B1 | 11/2004 | Eldering et al. | |
| 6,854,012 B1 | 2/2005 | Taylor | |
| 6,910,186 B2 | 6/2005 | Kim | |
| 6,917,944 B1 | 7/2005 | Prasad et al. | |
| 6,948,131 B1 | 9/2005 | Neven et al. | |
| 6,954,728 B1 | 10/2005 | Kusumoto et al. | |
| 6,970,840 B1 | 11/2005 | Yu et al. | |
| 6,973,436 B1 | 12/2005 | Shkedi | |
| 6,985,966 B1 | 1/2006 | Gupta et al. | |
| 7,006,098 B2 | 2/2006 | Bickmore et al. | |
| 7,034,678 B2 | 4/2006 | Burkley et al. | |
| 7,036,082 B1 | 4/2006 | Dalrymple et al. | |
| 7,039,932 B2 | 5/2006 | Eldering | |
| 7,043,746 B2 | 5/2006 | Ma | |
| 7,054,900 B1 | 5/2006 | Goldston | |
| 7,065,550 B2 | 6/2006 | Raghunandan | |
| 7,085,732 B2 | 8/2006 | Gould | |
| 7,107,549 B2 | 9/2006 | Deaton et al. | |
| 7,136,871 B2 | 11/2006 | Ozer et al. | |
| 7,150,030 B1 | 12/2006 | Eldering et al. | |
| 7,155,680 B2 | 12/2006 | Akazawa et al. | |
| 7,158,959 B1 | 1/2007 | Chickering et al. | |
| 7,197,126 B2 | 3/2007 | Kanada | |
| 7,216,002 B1 | 5/2007 | Anderson | |
| 7,248,677 B2 | 7/2007 | Randall et al. | |
| 7,302,429 B1 | 11/2007 | Wanker | |
| 7,396,281 B2 | 7/2008 | Mendelsohn et al. | |
| 7,483,958 B1 | 1/2009 | Elabbady et al. | |
| 7,599,983 B2 | 10/2009 | Harper et al. | |
| 7,614,016 B2 | 11/2009 | Wong et al. | |
| 7,840,903 B1 | 11/2010 | Amidon et al. | |
| 7,849,420 B1 | 12/2010 | Amidon et al. | |
| 8,600,808 B2 | 12/2013 | Amidon et al. | |
| 2001/0021920 A1 | 9/2001 | Ikeda | |
| 2002/0007488 A1 | 1/2002 | Kikinis et al. | |
| 2002/0013757 A1 | 1/2002 | Bykowsky et al. | |
| 2002/0019774 A1 | 2/2002 | Kanter | |
| 2002/0033848 A1 | 3/2002 | Sciammarella et al. | |
| 2002/0042293 A1 | 4/2002 | Ubale et al. | |
| 2002/0042782 A1 | 4/2002 | Albazz et al. | |
| 2002/0046084 A1 | 4/2002 | Steele et al. | |
| 2002/0046099 A1 | 4/2002 | Frengut et al. | |
| 2002/0072922 A1 | 6/2002 | Suzuki et al. | |
| 2002/0085031 A1 | 7/2002 | Conrado et al. | |
| 2002/0092017 A1 | 7/2002 | Klosterman et al. | |
| 2002/0095333 A1 | 7/2002 | Jokinen et al. | |
| 2002/0113820 A1 | 8/2002 | Robinson et al. | |
| 2002/0120506 A1 | 8/2002 | Hagen | |
| 2002/0129368 A1 | 9/2002 | Schlack et al. | |
| 2002/0138291 A1 | 9/2002 | Vaidyanathan et al. | |
| 2002/0138440 A1 | 9/2002 | Vaidyanathan et al. | |
| 2002/0151327 A1 | 10/2002 | Levitt | |
| 2002/0152117 A1 | 10/2002 | Cristofalo et al. | |
| 2002/0156875 A1 | 10/2002 | Pabla | |
| 2002/0171647 A1 | 11/2002 | Sterchi et al. | |
| 2002/0184047 A1 | 12/2002 | Plotnick et al. | |
| 2002/0194215 A1 | 12/2002 | Cantrell et al. | |
| 2002/0198746 A1 | 12/2002 | Bending | |
| 2003/0005439 A1 | 1/2003 | Rovira | |
| 2003/0028451 A1 | 2/2003 | Ananian | |
| 2003/0051255 A1 | 3/2003 | Bulman et al. | |
| 2003/0079177 A1 | 4/2003 | Brintzenhofe et al. | |
| 2003/0101450 A1* | 5/2003 | Davidsson et al. | 725/32 |
| 2003/0110056 A1 | 6/2003 | Berghofer et al. | |
| 2003/0115597 A1 | 6/2003 | Yassin et al. | |
| 2003/0120662 A1 | 6/2003 | Vishik | |
| 2003/0139966 A1 | 7/2003 | Sirota et al. | |
| 2003/0149975 A1 | 8/2003 | Eldering et al. | |
| 2003/0154212 A1 | 8/2003 | Schirmer et al. | |
| 2003/0163597 A1 | 8/2003 | Hellman et al. | |
| 2003/0174178 A1 | 9/2003 | Hodges | |
| 2003/0179228 A1 | 9/2003 | Schreiber et al. | |
| 2003/0187984 A1 | 10/2003 | Banavar et al. | |
| 2003/0191814 A1 | 10/2003 | Tran | |
| 2003/0204605 A1 | 10/2003 | Hudson et al. | |
| 2003/0204846 A1 | 10/2003 | Breen et al. | |
| 2003/0226142 A1 | 12/2003 | Rand | |
| 2003/0231854 A1 | 12/2003 | Derrenberger | |
| 2004/0015562 A1 | 1/2004 | Harper et al. | |
| 2004/0024720 A1 | 2/2004 | Fairweather | |
| 2004/0053690 A1 | 3/2004 | Fogel et al. | |
| 2004/0073924 A1 | 4/2004 | Pendakur | |
| 2004/0078432 A1 | 4/2004 | Manber et al. | |
| 2004/0125136 A1 | 7/2004 | Wallenius | |
| 2004/0133512 A1 | 7/2004 | Woolston | |
| 2004/0135820 A1 | 7/2004 | Deaton et al. | |
| 2004/0139025 A1 | 7/2004 | Coleman | |
| 2004/0162759 A1 | 8/2004 | Willis | |
| 2004/0179039 A1 | 9/2004 | Blattner et al. | |
| 2004/0189701 A1 | 9/2004 | Badt, Jr. | |
| 2004/0193484 A1 | 9/2004 | Allen | |
| 2004/0193673 A1 | 9/2004 | Samji et al. | |
| 2004/0199867 A1 | 10/2004 | Brandenborg | |
| 2004/0215568 A1 | 10/2004 | Fukushima et al. | |
| 2004/0220893 A1 | 11/2004 | Spivack et al. | |
| 2004/0239681 A1 | 12/2004 | Robotham et al. | |
| 2004/0240652 A1 | 12/2004 | Kanada | |
| 2005/0010637 A1 | 1/2005 | Dempski et al. | |
| 2005/0015725 A1* | 1/2005 | Matsuda | 715/706 |
| 2005/0030309 A1 | 2/2005 | Gettman et al. | |
| 2005/0033641 A1 | 2/2005 | Jha et al. | |
| 2005/0037410 A1 | 2/2005 | Kendall et al. | |
| 2005/0050079 A1 | 3/2005 | Plastina et al. | |
| 2005/0060746 A1 | 3/2005 | Kim | |
| 2005/0086605 A1 | 4/2005 | Ferrer et al. | |
| 2005/0091109 A1 | 4/2005 | Howard et al. | |
| 2005/0091111 A1 | 4/2005 | Green et al. | |
| 2005/0091160 A1 | 4/2005 | Kitze et al. | |
| 2005/0097599 A1 | 5/2005 | Plotnick et al. | |
| 2005/0108776 A1 | 5/2005 | Carver et al. | |
| 2005/0132420 A1* | 6/2005 | Howard et al. | 725/135 |
| 2005/0137015 A1 | 6/2005 | Rogers et al. | |
| 2005/0137958 A1 | 6/2005 | Huber et al. | |
| 2005/0154701 A1 | 7/2005 | Parunak et al. | |
| 2005/0159970 A1 | 7/2005 | Buyukkokten et al. | |

(56) References Cited

U.S. PATENT DOCUMENTS

| | | |
|---|---|---|
| 2005/0179685 A1* | 8/2005 | Kake et al. .................. 345/419 |
| 2005/0198353 A1 | 9/2005 | Zmrzli |
| 2005/0210387 A1 | 9/2005 | Alagappan et al. |
| 2005/0216346 A1 | 9/2005 | Kusumoto et al. |
| 2005/0264647 A1 | 12/2005 | Rzeszewski et al. |
| 2005/0283796 A1 | 12/2005 | Flickinger |
| 2006/0004799 A1 | 1/2006 | Wallender |
| 2006/0015904 A1 | 1/2006 | Marcus |
| 2006/0020973 A1 | 1/2006 | Hannum et al. |
| 2006/0026067 A1 | 2/2006 | Nicholas et al. |
| 2006/0036490 A1 | 2/2006 | Sagalyn |
| 2006/0047635 A1 | 3/2006 | Kraenzel et al. |
| 2006/0053194 A1 | 3/2006 | Schneider et al. |
| 2006/0059509 A1 | 3/2006 | Huang et al. |
| 2006/0064411 A1 | 3/2006 | Gross et al. |
| 2006/0064645 A1 | 3/2006 | Neven et al. |
| 2006/0085254 A1 | 4/2006 | Grim, III et al. |
| 2006/0100923 A1 | 5/2006 | Courchesne |
| 2006/0100928 A1 | 5/2006 | Walczak, Jr. et al. |
| 2006/0111188 A1 | 5/2006 | Winkler |
| 2006/0111979 A1 | 5/2006 | Chu |
| 2006/0128469 A1 | 6/2006 | Willis et al. |
| 2006/0135232 A1 | 6/2006 | Willis |
| 2006/0135732 A1 | 6/2006 | Yeager |
| 2006/0148512 A1 | 7/2006 | Ekholm et al. |
| 2006/0155597 A1 | 7/2006 | Gleason |
| 2006/0161635 A1 | 7/2006 | Lamkin et al. |
| 2006/0184579 A1 | 8/2006 | Mills et al. |
| 2006/0195515 A1 | 8/2006 | Beaupre et al. |
| 2006/0212350 A1 | 9/2006 | Ellis et al. |
| 2006/0217201 A1 | 9/2006 | Berstis et al. |
| 2006/0218225 A1 | 9/2006 | Voon et al. |
| 2006/0235790 A1 | 10/2006 | Jung et al. |
| 2006/0242234 A1 | 10/2006 | Counts et al. |
| 2006/0242581 A1 | 10/2006 | Manion et al. |
| 2006/0253323 A1 | 11/2006 | Phan et al. |
| 2006/0271997 A1 | 11/2006 | Jacoby et al. |
| 2006/0277474 A1 | 12/2006 | Robarts et al. |
| 2006/0282391 A1 | 12/2006 | Peterka et al. |
| 2006/0287915 A1 | 12/2006 | Boulet et al. |
| 2006/0288362 A1 | 12/2006 | Pulton, Jr. et al. |
| 2006/0293954 A1 | 12/2006 | Anderson et al. |
| 2007/0011050 A1 | 1/2007 | Klopf et al. |
| 2007/0011273 A1 | 1/2007 | Greenstein et al. |
| 2007/0011617 A1 | 1/2007 | Akagawa et al. |
| 2007/0013701 A1 | 1/2007 | Segawa et al. |
| 2007/0033107 A1 | 2/2007 | Ubale et al. |
| 2007/0061204 A1 | 3/2007 | Ellis et al. |
| 2007/0073614 A1 | 3/2007 | Jung et al. |
| 2007/0079326 A1 | 4/2007 | Datta et al. |
| 2007/0082738 A1 | 4/2007 | Fickie et al. |
| 2007/0094691 A1 | 4/2007 | Gazdzinski |
| 2007/0106526 A1 | 5/2007 | Jung et al. |
| 2007/0127889 A1 | 6/2007 | Seo |
| 2007/0156726 A1 | 7/2007 | Levy |
| 2007/0184855 A1 | 8/2007 | Klassen et al. |
| 2007/0198364 A1 | 8/2007 | Quoc et al. |
| 2007/0204287 A1 | 8/2007 | Conradt et al. |
| 2007/0207860 A1 | 9/2007 | Yamauchi et al. |
| 2007/0223675 A1 | 9/2007 | Surin et al. |
| 2007/0287498 A1 | 12/2007 | Wang et al. |
| 2007/0288470 A1 | 12/2007 | Kauniskangas et al. |
| 2007/0299737 A1 | 12/2007 | Plastina et al. |
| 2008/0009268 A1 | 1/2008 | Ramer et al. |
| 2008/0052242 A1 | 2/2008 | Merritt et al. |
| 2008/0059422 A1 | 3/2008 | Tenni et al. |
| 2008/0091521 A1 | 4/2008 | Ho et al. |
| 2008/0104114 A1 | 5/2008 | Kasperkiewicz et al. |
| 2008/0201638 A1 | 8/2008 | Nair |
| 2008/0222295 A1 | 9/2008 | Robinson et al. |
| 2008/0257134 A1 | 10/2008 | Oppenheimer |
| 2008/0303811 A1* | 12/2008 | Van Luchene .................. 345/419 |
| 2009/0031006 A1 | 1/2009 | Johnson |
| 2009/0037822 A1 | 2/2009 | Kandekar et al. |
| 2009/0119614 A1 | 5/2009 | Tienvieri et al. |
| 2010/0131584 A1 | 5/2010 | Johnson |

FOREIGN PATENT DOCUMENTS

| | | |
|---|---|---|
| EP | 1 473 650 A1 | 3/2004 |
| EP | 1 689 143 A1 | 10/2004 |
| WO | WO 02/19581 A1 | 3/2002 |
| WO | WO 02/21831 A2 | 3/2002 |
| WO | WO 2004/036902 A1 | 4/2004 |
| WO | 2005/020129 A2 | 3/2005 |
| WO | WO 2006/036207 A1 | 4/2006 |

OTHER PUBLICATIONS

No Author, "Avatars—Yahoo! Messenger," (website), obtained May 17, 2007, 2 pages, http://messenger.yahoo.com/avatars.php.

No Author, "Cyworld," (website), obtained May 17, 2007, 4 pages, http://us.cyworld.com/main/index.php.

No Author, "Gravatar—Globally Recognized Avatars," (website), obtained May 17, 2007, 1 page, http://site.gravatar.com/.

No Author, "Luskwood Creatures," (website), obtained May 17, 2007, 7 pages, http://www.luskwood.com/index.htm.

No Author, "Meez—Avatars for MySpace, Xanga and IM," (website), obtained May 17, 2007, 17 pages, http://mashable.com/2006/08/22/meez-avatars-for-myspace-xanga-and-im/.

No Author, "MySpace," (website), obtained May 31, 2007, 2 pages, http://www.myspace.com.

No Author, "Pandora Radio," (website), obtained May 31, 2007, 1 page, http://www.pandora.com.

No Author, "Personalise Skype—Invent Yourself," (website), obtained May 17, 2007, 1 page, http://skype.klonies.com/studio.php.

No Author, "Press Releases Comverse," (website), obtained May 17, 2007, 3 pages, http://www.comverse.com/press_releases.aspx?newsId=412.

Alexander Pretschner et al., "Ontology Based Personalized Search," (article), Nov. 8-10, 1999, p. 391, Proceedings of the 11th IEEE International Conference on Tools with Artificial Intelligence.

Rana El Kaliouby et al., "FAIM: Integrating Automated Facial Affect Analysis in Instant Messaging," (article), 2004, pp. 244-246, In Proceedings of ACM International Conference on Intelligent User Interfaces (IUI).

No Author, "Rhapsody—Free access to millions of songs online," (website), obtained May 31, 2007, 3 pages, http://www.rhapsody.com/home.html.

T. Srinivasan et al., "OPSHNN: Ontology Based Personalized Searching Using Hierarchical Neural Networks Evidence Combination," (article), Sep. 2006, pp. 44-44, The Sixth IEEE International Conference on Computer and Information Technology 2006.

No Author, "Virtual World—Wikipedia," (website), obtained Sep. 21, 2007, 3 pages, http://en.wikipedia.org/wiki/Virtual_world.

No Author, "Ajax3D.org—The Open Platform for Rich 3D Web Applications," (website), obtained Sep. 21, 2007, 1 page, http://www.ajax3d.org/.

No Author, "Diverse—Device Independent Virtual Environments," (website), obtained Sep. 21, 2007, 2 pages, http://www.diverse-vr.org.

No Author, "Multiverse," (website), obtained Sep. 21, 2007, 1 page, http://www.multiverse.net/.

No Author, "Visible World: About Us," (website), obtained Sep. 21, 2007, 1 page, http://www.visibleworld.com/about/.

No Author, "Youniversal Branding," (website), obtained May 17, 2007, 31 pages, http://www.trendwatching.com/trends/YOUNIVERSALBRANDING.htm.

Smith, Steve; "Tapping the Feed: in search of an RSS Money Trail" Econtent; Mar. 2005; vol. 28, Issue 3; p. 30-34.

Krol, Carol; "RSS ad programs feed needs" B to B; Jul. 11, 2005; vol. 90 Issue 9; p. 1-33.

Examination Report for European Patent Application No. 08771370.7, issued Jan. 27, 2015, 6 pages.

(56) References Cited

OTHER PUBLICATIONS

Robinson, Jack, et al., Using Internet Content as the Means to Establish Social Networks by Linking Internet Users, Searchers, Viewers and/or Listeners of the Same and/or Similar Internet Content to Each Other Via a Platform That Enables Any of the Following in N-Dimensional Environments; Social Networking, Communications, Sharing, Co-Browsing, E-Commerce, Advertising, Search, Hosting and Registry Services, Push and Pull Applications.

Decision on Rejection for Chinese Patent Application No. 200880102408.2, issued Jun. 20, 2013, 9 pages (with English translation).

* cited by examiner

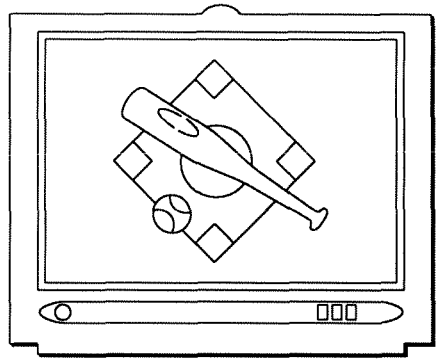
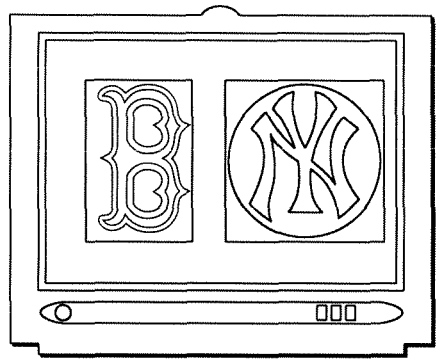
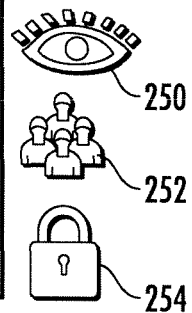
FIG. 10A            FIG. 10B
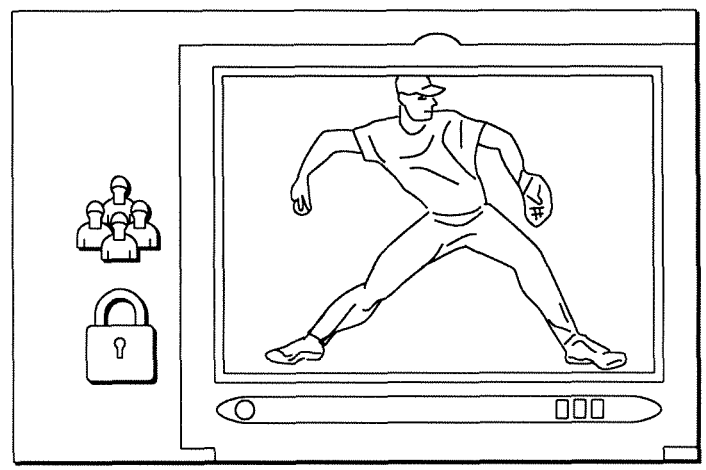
FIG. 10C

SYSTEM AND METHOD FOR REPRESENTING CONTENT, USER PRESENCE AND INTERACTION WITHIN VIRTUAL WORLD ADVERTISING ENVIRONMENTS

FIELD OF THE INVENTION

The present invention generally relates to optimization of user interactions in virtual world advertising environments.

BACKGROUND OF THE INVENTION

Targeted or narrowcast advertising can provide a more effective model for merchants and other advertisers to reach consumers. By better matching ad content with entertainment content and user preferences, a more personalized viewing experience is possible with less resistance to the commercial content from the consumer. Thus, associated commercial content may be received more favorably. Such commercial content, although potentially targeted and/or personalized, is often limited in some contexts to traditional video advertisements.

Variable delivery options for programming, advertising, and other content are due at least in part to continued development of computing devices such as set top boxes (STBs) for cable, satellite and IPTV (internet protocol television), as well as integration of some or all such functionality into televisions and other displays. For example, so-called "interactive" ads have been proposed whereby a viewer must provide responses during the course of an advertisement, such as choices for determining an ending in an advertisement with a variable storyline.

As systems emerge that can tailor advertising to individual consumers, and as flexibility and user control are enabled at consumer systems (e.g., set top boxes), consumers will be more open to accepting and expecting alternative methods for delivery of advertisements, such as those that involve user interaction with advertisements presented in a virtual world environment. When multiple users are placed into a virtual world environment, it should be appreciated that user presence and interaction will often be quite dynamic since users are often in a virtual world for a limited duration of time during each ad presentation opportunity. As such, there remains a continuing need to optimize user representations and interaction within a dynamic virtual world advertising environment.

SUMMARY OF THE INVENTION

The presently disclosed technology is generally concerned with the functionality of a control system for coordinating the representation and interaction among networked users capable of or actually participating in a virtual environment. In one example, virtual environments are employed during advertising time slots available during user access of regular media content, such as but not limited to television, internet, video, music, internet or other media services. During these time slots, the presently disclosed technology may provide an option for users to enter one or more virtual world environments where the users can interact with other users who are also at time slot breaks from their accessed media content.

User presence within virtual environments of the present disclosure is often highly dynamic since a user's time within virtual environments is often relatively short compared with traditional virtual environments that persist with more constant user presence. Aspects of the present invention are directed to optimizing the user representations and interactions within such dynamic virtual environments, and so provide features for representing the users, the media content and advertisements accessed by such users, other content available from such users, and other related parameters.

In one particular example of the present technology, at least one computing device associated with a control system is adapted to provide access to and render a shared virtual environment to multiple users, including a viewing user and a hosting user. Metadata associated with the hosting user is obtained by the control system, and such metadata may be related to the content accessed by the hosting user. Exemplary metadata parameters may include, but are not limited to, content viewing actions, past content selection, current content selection, future scheduled content selection, content preferences, advertising preferences, and advertisement viewing actions.

Once selected portions of metadata are gathered in an appropriate fashion, representations are provided to a viewing user. Representations may be provided within the background context of the virtual environment and may include visual elements serving as host representations and content representations. One example of a host representation is an avatar and multiple content representations (e.g., video, graphic, symbolic, iconic or alphanumeric visual elements presented alongside or integrated with the host representation). Applicable content representations are identified from a plurality of defined possible content representations based on the metadata associated with and obtained for a hosting user. The content representations (and/or the host representation) may be descriptive of a variety of parameters, including but not limited to the type, timing, nature or other parameters associated with content currently being accessed by a hosting user, content available from the hosting user, a future schedule for content access, time remaining for the hosting user to remain within a shared virtual environment, and the hosting user's social network status relative to the viewing user. The presentation of such host and content representations to a viewing user may be filtered based on user preferences of the viewing user. As such, representations of hosts, content, and other features may appear differently to different viewing users. Presence representations may also be provided to communicate information on a hosting user's presence availability within a shared virtual environment relative to one or more determined time slots, such as corresponding to advertising opportunities or the like. Presence representations may be effected in a number of ways, including by a simple time clock, different color or shape indications, or graduated fading among different estimated periods of time. In some examples, at least some sort of presence representation for a hosting user remains in the virtual world, even if the hosting user is not currently present. If not present, invitations may be sent to invite those users to enter the virtual world environment or to join a group of other users.

Customization of views and representations may be implemented in embodiments of the present invention. For example, content, host and presence representations may be displayed according to one or more preferences associated with a viewing or hosting user. Also, the virtual environment rendered to a given viewing user may be selected based on one or more parameters associated with the viewing user, including the other users in a virtual environment, user or viewer identifiers, user or viewer demographics, user or viewer interests, current time of day, month, day, season, genre or rating of media content, user location and others.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

FIGS. 10A, 10B and 10C illustrate respective exemplary content representations according to different embodiments of the present invention;

Use of like reference numerals in different features is intended to illustrate like or analogous components.

DETAILED DESCRIPTION OF THE PREFERRED EMBODIMENTS

Figure 1B:
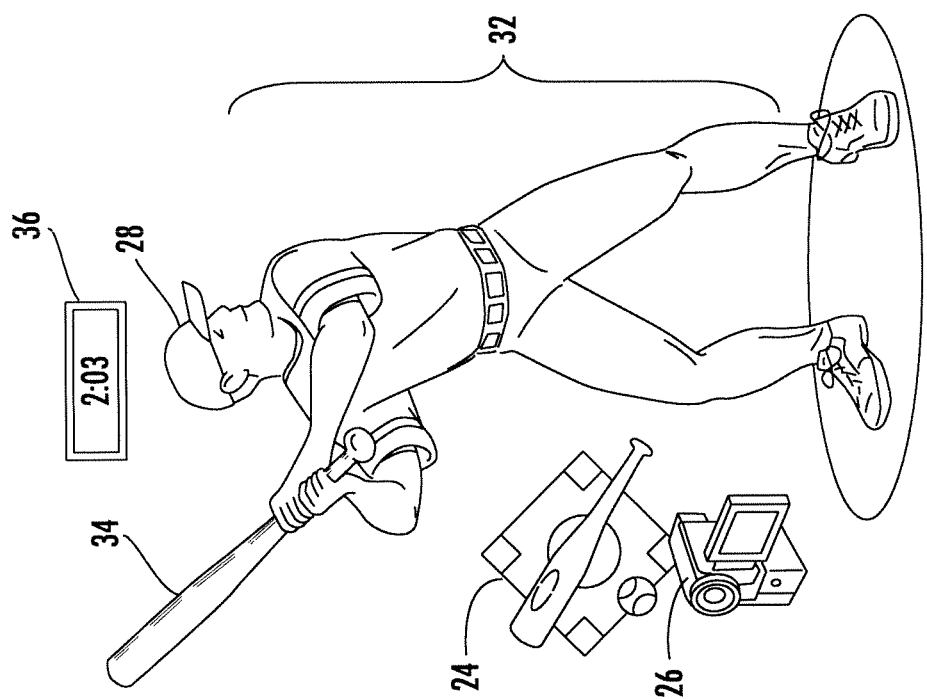
FIGS. 1A and 1B illustrate an exemplary host representation in the form of an avatar without and with content and presence representations according to one embodiment of the present invention.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and/or other computer-based processors and systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server or computing processes discussed herein may be implemented using a single processor or multiple processers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. When file(s) or data are transferred between two computers, for instance, the actual file(s) or data may move between the computers, or one computer may provide a pointer or metafile that the other computer uses to access the actual data by going to one or more additional computers.

The present disclosure also makes reference to the relay of communicated data over a network such as the Internet. However, any suitable network or combination(s) of networks may be used. For instance, communications may occur over a dial-in network, a local area network (LAN), wide area network (WAN), public switched telephone network (PSTN), the Internet, intranet or other type(s) of networks. Network configurations may comprise any combination of hard-wired (metallic and/or fiber-optic) or wireless communication links, and other more particular network configurations as discussed herein or as appreciated by one of skill in the art.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form, which thus configure the computing devices to function as special purpose machines adapted to perform designated steps. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computer, cause the at least one computer to implement one or more embodiments of the methods disclosed herein. Furthermore, components of the presently-disclosed technology, such as knowledge bases and data stores, may be implemented using one or more computer-readable media.

Any suitable computer-readable medium or media may be used to implement or practice the presently-disclosed subject matter, including diskettes, drives, and other magnetic-based storage media, optical storage media, including disks (including CD-ROMS, DVD-ROMS, and variants thereof), flash, RAM, ROM, and other memory devices, and the like.

Several examples of presenting ads in a consumer-defined context will be discussed below. Generally, in several of the examples, advertisements may or may not be executed while users are immersed in a shared or collaborative "virtual world environment," and such ads may be referred to as "virtual world advertisements." A "virtual world advertisement" is meant to include any advertisement wherein a virtual world is rendered and one or more advertisements are placed in and/or alongside the virtual world. Generally speaking, a virtual world (or virtual world environment) is a computer-based simulated environment that can be optionally inhabited by one or more users by way of avatars or other host representations. Avatars can be representations of nearly any object or creature (real or imagined), occurring in a variety of dimensional fashions (e.g., one-, two- or three-dimensional). However, in addition to or as an alternative to avatars, a virtual world can include one or more places (such as rooms or locations), and/or other virtual world objects. For example, a virtual world may be displayed as a form of first person view into a given environment or location. In some instances, a virtual world is characterized by limitations on movement (such as gravity and topography), limitations and specifications on the interaction of objects/avatars such as behavioral rules, and/or other rules. In some embodiments, a virtual world may be rendered as an immersive environment to present a 3-D or simulated 3-D environment. As will be discussed below, in some embodiments of the present subject matter, a virtual world is rendered based on consumer preferences/parameters while the advertisement is placed in or alongside the environment subject to rules provided by the advertiser and, in some embodiments, additional data provided by or pertaining to the consumer(s) of the advertisement. Different windows or displays may be used to provide different views of one or more virtual world environments and corresponding features associated therewith.

Virtual world advertisements may be distributed in any suitable manner. In some embodiments, the virtual world advertisements are distributed alongside or instead of "traditional" advertisements such as video advertisements and interactive, but non-immersive advertisements. In some embodiments, virtual world advertisements may be distributed using embodiments of consumer-centric advertising systems. However, virtual world advertisements can be distributed using any other suitable system(s), and the particular mode of distribution used in examples herein is not intended to limit the scope of the present subject matter.

The presently disclosed technology is generally concerned with the functionality of a control system for coordinating the representation and interaction among networked users capable of or actually participating in a virtual environment. In one example, virtual environments are employed during advertising time slots available during user access of regular media content, such as but not limited to television, internet, video, music, internet or other media services. The specific examples herein are discussed in the context of television networks, although it should be appreciated that such an environment should not be unnecessarily limiting to the present technology.

As appreciated by one of ordinary skill in the art, conventional media services provide content to a user such as a television program, movie, and the like. Various advertisement presentation opportunities may exist at certain preconfigured time slots within such provided content. For example, "commercial breaks" may occur at regularly scheduled intervals within an hour-long television program. In another example, a single advertisement opportunity may be provided at the beginning of a movie or other segment of video content. A still further example of an advertisement presentation opportunity may arise when regularly scheduled programming is delayed because of unforeseen circumstances (e.g., rain delay for a sporting event).

During these time slots, the presently disclosed technology may provide an option for users to enter one or more virtual world environments where the users can interact with other users who are also at time slot breaks from their accessed media content. The present disclosure may interchange terminology by referring to virtual world environments as either virtual environments or virtual worlds, and it should be appreciated that all such terms are generally synonymous. Virtual worlds are known for use in several different areas, such as gaming and simulations.

The present invention may involve any suitable virtual world, which can be rendered by any suitable engine(s) or technologies for implementing such world(s). Generally speaking, the virtual world will be defined by parameters that specify movement rules, permitted conduct and objects, and other constraints on activity therein. As is known, a virtual world can support various virtual entities such as avatars and objects therein. Any suitable activities can occur in a virtual world pursuant to the parameters defining the world. For advertising purposes, this can include, for example, display of a logo or graphics (2-D or 3-D), video and audio clips, interactive avatars or other objects, and the like.

In one embodiment, only a single virtual world environment is available to users subscribing to one or more media services provided by a transport provider. In other embodiments, a given user manually selects or is automatically matched to one of multiple virtual world environments that are available. In still further examples, a user may select multiple virtual worlds to enter during a given time slot, with display features for toggling between the worlds or for simultaneous display of such worlds, such as by a picture-in-picture mode, split display format, or the like.

Regardless of whether single or multiple virtual worlds are available for a user, user presence within such virtual environment(s) is highly dynamic and constantly changing since a user's time within virtual environments is often relatively short compared with traditional virtual environments having a more constant user presence. Aspects of the present invention are directed to optimizing the user representations and interactions within such dynamic virtual environments, and so provide features for representing the users, the media content and advertisements accessed by such users, other content available from such users, and other related parameters. Many of such representations are described herein as visual representations, although it should be appreciated that audio, file or property-based representations may additionally or alternatively be implemented.

Control systems for implementing various aspects of the disclosed technology may be provided at a variety of locations. In one example, a control system is part of a server that is networked to one or more users, including a hosting user and viewing user as will be discussed in more detail herein. In other embodiments, control systems may be effected by multiple client devices associated with a distributed network, such as a peer-to-peer (P2P) configuration or the like. In still further embodiments, control systems may be provided at one or more intermediate nodes in between one or more client devices and remote servers. Any combination of the above locations may also be used to provide the control and processing functionality of the present invention. Embodiments of the present invention may be directed to a control system adapted to provide various functionality or alternatively to the methods accomplished by performing such functionality.

Examples of the present technology relate to the integration of multiple users in a virtual environment. One user in such an environment is referred to herein as a viewing user, and corresponds to an given entity who is capable of or is actually participating in a virtual environment. The other users with which the viewing user is able to interact, and whose host representations may be viewed by the viewing user are referred to herein as hosting users. It should be appreciated that any given member of a virtual world will most often exist simultaneously as a viewing user and a hosting user, depending on which user's point of view is being considered.

In one particular example of the present technology, at least one computing device associated with a control system is adapted to provide access to and render a shared virtual environment to multiple users, including a viewing user and a hosting user. Although this particular example and others describe the interaction between a single viewing user and a single hosting user, it should be appreciated that multiple viewing and/or hosting users may be present within a virtual environment. Metadata associated with the hosting user is obtained by the control system, and such metadata may be related to the content accessed by the hosting user. For example, if a hosting user enters a virtual environment during an advertising slot within a TV showing of a baseball game, then the gathered metadata relates to parameters defining the baseball game and related parameters such as but not limited to the channel on which the baseball game is shown, the delivery method of the baseball game content, etc. Exemplary metadata parameters may include, but are not limited to, content viewing actions, past content selection, current content selection, future scheduled content selection, content preferences, advertising preferences, and advertisement viewing actions. More specific aspects of such content metadata parameters will be discussed later in more detail.

The metadata described above may be obtained in a variety of fashions. In one example, an agent associated with a client device of the hosting user periodically sends summary updates of such metadata to a central location, such as a transport provider. In other embodiments, content metadata classification can take place on a user's client device before being sent to another location, thus addressing certain privacy concerns. In accordance with such an embodiment, a query may be sent from the transport provider to a hosting user. The query may contain an ontology of interest, a predicate (which describes a membership qualification for a node in the ontology of interest), and a scoring algorithm. A response is sent to the transport provider, including a score representing an evaluation of the predicate to metadata associated with the targeted system. The score represents how well the metadata matches the ontology of interest. In one example, the scoring algorithm applies a weighting factor to relationships between nodes in the ontology.

Once selected portions of metadata are gathered in an appropriate fashion, representations are provided to a viewing user. Representations may be provided within the background context of the virtual environment and may include visual elements serving as host representations and content representations. One example of a host representation is an avatar with multiple content representations (e.g., video, graphic, symbolic, iconic or alphanumeric visual elements presented alongside or integrated with the host representation). Applicable content representations are identified from a plurality of defined possible content representations based on the metadata associated with and obtained for a hosting user. The content representations (and/or the host representation) may be descriptive of a variety of parameters, including but not limited to the type, timing, nature or other parameters associated with content currently being accessed by a hosting user, content available from the hosting user, a future schedule for content access, time remaining for the hosting user to remain within a shared virtual environment, and the hosting user's social network status relative to the viewing user. Content representations may be two-dimensional representations or an actual buffered display of content being accessed by or available from a hosting user. The presentation of such host and content representations to a viewing user may be filtered based on user preferences of the viewing user. As such, representations of hosts, content, and other features may appear differently to different viewing users.

In still further particular embodiments of the subject technology, representations displayed in or otherwise provided relative to a virtual environment correspond to presence representations. Presence representations provide information on a hosting user's presence availability within a shared virtual environment relative to one or more determined time slots, such as corresponding to advertising opportunities or the like. It should be appreciated that these time slots may be used to provide traditional or virtual advertisements within the virtual world environment in addition to the general rendering of the virtual world to accommodate basic user interaction of participating users. Presence representations may provide an indication of estimated remaining time within a time slot or of estimated remaining time until a given hosting user enters or exits the shared environment. This may be effected in a number of ways, including by a simple time clock, different color or shape indications, or graduated fading among different estimated periods of time. In some examples, at least some sort of presence representation for a hosting user remains in the virtual world, even if the hosting user is not currently present. If not present, invitations may be sent to invite those users to enter the virtual world environment or to join a group of other users.

Customization of views and representations may be implemented in embodiments of the present invention. For example, content, host and presence representations may be displayed according to one or more preferences associated with a viewing or hosting user. Also, the virtual environment rendered to a given viewing user may be selected based on one or more parameters associated with the viewing user, including the other users in a virtual environment, user or viewer identifiers, user or viewer demographics, user or viewer interests, current time of day, month, day, season, genre or rating of media content, user location and others.

Figure 1A:
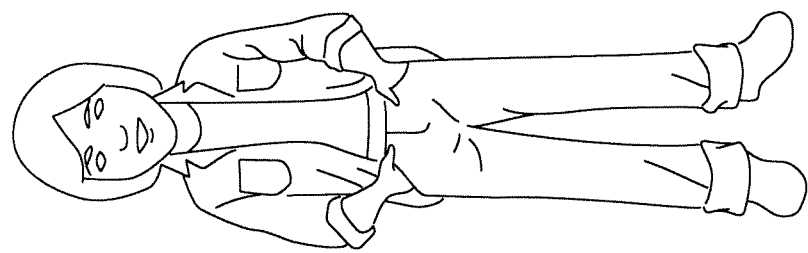

Reference will now made to the drawings. In general, FIGS. 1A and 1B illustrate exemplary representations in accordance with aspects of the present technology. FIG. 1A illustrates a host representation in the form of an avatar without any associated content or presence representations. FIG. 1B illustrates a host representation in the form of an avatar having associated content representations 24-34 and a presence representation 36. Content representation 24 is a graphic including a baseball diamond, baseball and bat and indicates that the user corresponding to the avatar of FIG. 1B is currently watching or scheduled to watch sports-related content. Content representation 26 is a video camera and may represent that the user is currently watching or scheduled to watch an upcoming movie. Together, the content representations 24 and 26 may indicate that the user is watching a movie related to baseball. Additional interaction with the user's avatar of FIG. 1B may reveal to another user the exact name of the movie and whether the movie is available for previewing or copying. Presence representation 36 corresponds to a time clock indicating how long the user has in the given ad time slot before returning to the baseball movie. Note that while the representations 24, 26 and 36 of FIG. 1B are presented alongside the avatar, the present technology is not limited thereto. Representations 24, 26 and 36 may be presented anywhere in the view of the virtual environment presented to a viewing user or in a separate window.

While the representations 24, 26 and 36 are presented near the avatar, content and/or presence representations may additionally or alternatively be presented by modifying the appearance of the avatar. In this example, a content representation 28 is presented by modifying the avatar such that the avatar is wearing a baseball hat. In addition, a content representation 32 is presented by modifying the clothes of the avatar to represent a baseball uniform. In a similar fashion, content representation 34 is a baseball bat appearing in the hand of the avatar. One or more of the content representations 28, 32 and 34 may be utilized to indicate that the user is watching content related to baseball. Further, the display of a New York Yankees logo on the avatar's hat representation 28 indicates that the user is watching content related to the New York Yankees. Additional aspects of a content representation may correspond to modifying a pose or positioning of the avatar.

Figure 2:
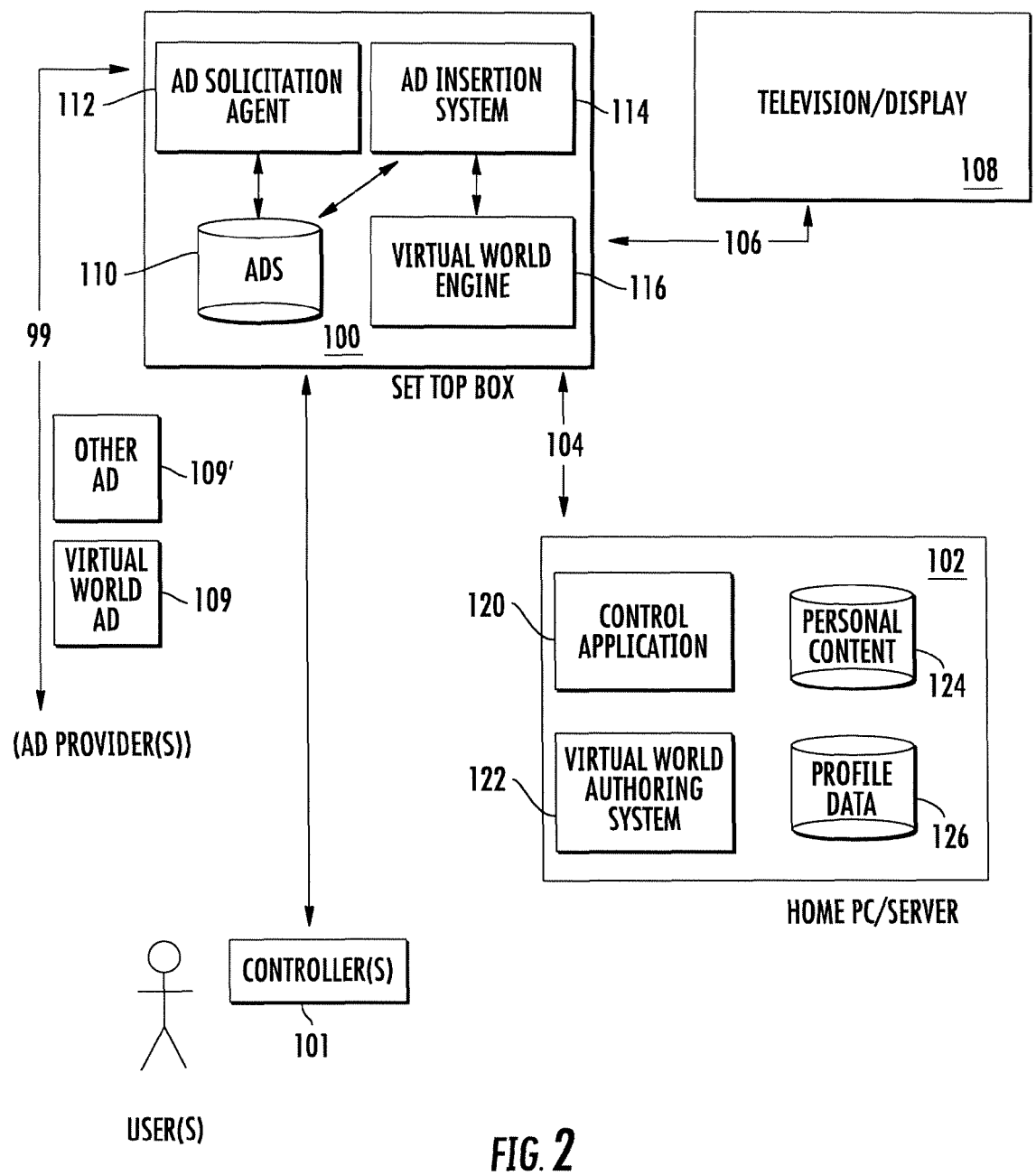
FIG. 2 illustrates a functional block diagram of an exemplary consumer-centric advertising distribution system according to one embodiment of the present invention.

FIG. 2 illustrates a consumer-defined system for providing virtual world advertisements as associated with a given user. The system of FIG. 2 enables a user to define and control the playback environment for advertisements utilizing a virtual world environment. This context is described relative to user interaction at one set top box 100 associated with the given user.

Referring to FIG. 2, consumer ad solicitation agent 112 may comprise one or more software agents or routines adapted to contact advertising entities and obtain ad definition data. For instance, agent 112 may participate in or conduct auctions where consumer ad time is exchanged for incentives from advertising entities. In some embodiments, some of the resulting advertisements may be "traditional" (e.g. video or non-immersive interactive ads) while other advertisements are virtual world advertisements. Thus, the ad solicitation agent 112 may be adapted to consider the benefits associated with virtual world advertisements along with any applicable limitations. For example, a vendor or other advertising entity may provide for a greater incentive for the presentation of its advertising content as part of a virtual world advertisement, but the content may have certain hardware requirements, such as minimum required graphics capabilities that must be met for the consumer to receive credit for viewing the ad. In another example, a vendor or advertising entity may provide for a greater incentive based on an increased number of users participating in a shared virtual world environment at the time the advertisement is executed. Therefore, the ad solicitation agent 112 can be configured to take such considerations into account when choosing ads and negotiating for display of ads. Once ad solicitation agent 112 has successfully negotiated for the display of one or more ads, the ads may be downloaded for local storage and later retrieval in ad stores 110 associated with various respective user systems.

Set top box 100 may be connected to content providers and ad vendors (via outside network(s) 99), display 108 (via connections 106), and home PC/server 102 (via network 104). Any or all of networks/connections 99, 104, and 106 may comprise multiple networks, and any or all of the networks may be combined. For instance, display 108 and home PC/server 102 may both be connected to set top box 100 via a home network 104. Any component may be connected to one or more outside networks such as 99. For instance, in some embodiments, network 99 may comprise the Internet, which may be used for delivery of advertisements and/or programming content. In other embodiments, advertisements and/or programming content may be delivered via other networks, such as through a cable television system, telephone system, or satellite system, for example. All of the components may be connected to one another via home network 104, the internet, and/or other outside networks.

Functionality provided by set top box 100, home PC/server 102, and display 108 may be provided by more or fewer devices than are shown in the example of FIG. 2. For instance, set top box functionality and display functionality may be integrated into a single unit. Similarly, some or all functionality provided by home PC/Server 102 may be combined with that of set top box 100. For example, a media PC or appliance may provide set top box functions and PC functions. Thus, it will be appreciated that the configuration shown in FIG. 2 is for purposes of example only.

Home PC/server 102 may comprise any suitable type and number of computing device(s), such as a desktop, laptop, or server computer of any architecture using any operating system. Computing device 102 (shown in this example as PC/Server 102) comprises one or more suitable devices that can be used in support of the virtual world environments and advertisements in some embodiments. For instance, device 102 may include storage of personal content 124 and personal profile data 126 which may be used to determine which virtual world(s) to utilize, how to render advertisements, and which virtual world advertisements should be solicited by the system. For example, the consumer may provide preferences and other parameters controlling operation of the system using control application 120. As with the other functionality provided by device 102 in this example, control application 120 may be provided using set top box 100 in other embodiments. Virtual world authoring system 122 may represent any suitable application or groups of applications that can be used by consumers to construct and define virtual worlds. Authoring system 122 may, for example, comprise any world creation tool or tools such as AJAX3D, DIVERSE, Multiverse, and the like. In some embodiments, consumers may access templates or fully-defined virtual world environments. For instance, users may generate and share environments or purchase environments from third-party providers. As another example, system 122 may comprise one or more virtual world authoring tools adapted to construct or modify gaming environments.

In some embodiments of the present subject matter, the advertising consumer provides various parameters, such as preferred virtual environments, conditions for virtual environment selection, and profiling data, which are used to customize the context in which advertisements are presented. For instance, rather than having no control over how an advertisement is presented, the consumer is provided an additional level of control since the advertisements are presented in the consumer-defined context. Simultaneously, however, the advertising content is subject to rules and restrictions provided by the advertising entity so that the message of the ad is not lost.

For example, a consumer may be watching television programming alone and configure the system to deliver all ads in a virtual re-creation of Fenway Park baseball stadium. For example, the baseball stadium environment can be rendered using a third party gaming system or gaming engine included as part of set top box 100. As the consumer watches the ad, memorable plays can be re-enacted in the virtual world while the ad is displayed therein. For example, the ad may be displayed in conjunction with the virtual world, such as an ad presented alongside the virtual world (such as a picture-in-picture). As another example, the ad may be incorporated into the virtual world, such as presented in the stadium on a simulated jumbo screen or on a blimp visible above the stadium. As another example, the consumer may configure the system so that, when the consumer and the consumer's spouse are watching television together, ads are presented on a is virtual TV in a simulated beach environment where avatars representing the consumer and spouse are relaxing. However, these examples are not intended to be limiting. For instance, other avatars or objects could be defined in the ad and interact with the viewers.

In other embodiments of the present technology, such as when multiple users are participating in a shared virtual world environment, the environment may be selected in a variety of fashions. In one example, the virtual world environment can be selected by the user who initiates the collaboration among multiple users. In another example, the environment is selected or configured based on parameters associated with some or all of the invited or participating users. For instance, a Fenway Park interactive environment may be utilized if a majority of the participating users are indicated as having an interest in sports or baseball. In still further embodiments, multiple users may be respectively shown environments that are different and tailored for the particular users. For instance, a shared virtual world environment may generally be selected as a baseball stadium, but the stadium is provided as Fenway Park for Boston Red Sox fans, Yankee Stadium for New York Yankee fans, Turner Field for Atlanta Braves fans, etc.

In some embodiments, virtual world advertisements can be defined using one or more digital files that comprise content for the virtual world ads. For instance, the file(s) may comprise a package that is handled within advertising negotiation and distribution systems in a manner similar to how such systems handle other, non-virtual-world ads (such as video ads). For example, the package may comprise one or more XML files that define the ad, along with one or more vendor supplied content items such as videos, graphics, and the like. Within the XML file, scripts may be utilized to define the various components, interactions, rules, and other advertisement parameters. The scripting language or format may be dependent on the type of virtual world engine that is used. For instance, one or more standards may be defined for the XML format for advertisers to abide by in construction of advertising packages. Advertisers may construct packages in any suitable manner, for example using authoring applications and/or manual construction.

The table below provides an exemplary XML file for a hypothetical virtual world ad provided to advertise a hypothetical cola ("SuperSoda"). However, any structured format can be used to define the ad. In this example, one of two possible video ads is played within the virtual environment depending on how many people are in the room. Additionally, an avatar, configured by the user, is utilized to introduce the ad. For example, the user may provide various avatars for use in virtual world ads that require the use of an avatar. For instance, a user may define an avatar based on him/herself or another avatar, such as a fanciful creature. The user-defined avatar can be selected and then acts according to the ad specifications.

TABLE 1

Hypothetical Virtual World Ad Definition File

```
<CAPS-Advertisement>
  <Header>
    <Vendor = "SuperSodaCo"/>
    <Ad Id = "123456"/>
  </Header>
  <Attachments>
    <ID="ab123" type="graphic" name="soda.gif"/>
    <ID="abc88" type="video" name="ad1.m2p"/>
    <ID="abc89" type="video" name="ad2.m2p"/>
  </Attachments>
  <script>
    <!-- The scripting syntax varies based on the supporting virtual
    world -->
    avatar1 = load_avatar(from_user, male, 0,0);
    avatar1.say("Hello", username, pause, "have you had a SuperSoda
    lately?");
    if (num_users == 1) {
      play_video("abc188", video_slot1);
    }
    else {
      play_video("abc189", video_slot1);
    }
  </script>
</CAPS-Advertisement>
```

Consumer ad solicitation agent 112 can utilize any suitable method or methods to identify and select ads. For instance, in some embodiments, an auction-based system can be utilized whereby the user defines preferences and/or profiles from which an auction agent or agents engage in negotiations to obtain and use the "best" ads. For example, the auction agent(s) may be configured to give higher value to virtual world ads, especially those in which multiple users are interacting and viewing the ads, and the preference may override other preferences such as economic value. Additionally, as noted above, ad definition data may depend on particular rendering engines and other specific functionality. For example, if the virtual world engine is included in a set top box, then the particular virtual world engine implementation may vary across set top box manufacturers. Therefore, consumer auction agents may be configured to validate ads to ensure the ads are compliant with the components of the system such as virtual world engine 116 and insertion system 114.

Virtual world engine 116 comprises any suitable hardware or software which, based on input parameters, can be used to render an immersive virtual environment. Virtual worlds are known for use in several different areas, such as gaming and simulations. Any suitable virtual world can be rendered and any suitable engine(s) can be used to render the world(s). Generally speaking, the virtual world will be defined by parameters that specify movement rules, permitted conduct and objects, and other constraints on activity therein. As is known, a virtual world can support various virtual entities such as avatars and objects therein. Any suitable activities can occur in a virtual world pursuant to the parameters defining the world. For advertising purposes, this can include, for example, display of a logo or graphics (2-D or 3-D), video and audio clips, interactive avatars or other objects, and the like.

Ad insertion system 114 represents software and/or hardware configured to obtain ad definition data and insert advertising content into the virtual world. For instance, ad definition data may specify the nature and extent of advertisements to be inserted into the virtual world. Ad insertion system 114 can provide commands to virtual world engine 116 so that the specified content and other activities occur in the virtual world pursuant to the ad definition data and user parameters.

Advertising content may be provided in any number of ways. For example, advertising content may be inserted into the fully-rendered virtual world environment, may be included as part of rendering the environment itself, and/or may be presented alongside the virtual world. In this example, ad insertion system 114 further sends playback/mixing signals so that display 108 changes from displaying content to displaying the rendered virtual world advertisement. For instance, ad insertion system 114 may detect or create a commercial break in programming content and switch audio/video playback from the programming content to a view of the virtual world rendered using engine 116 with advertisement(s) therein.

Additional aspects of virtual world advertisements and related consumer-centric ad auctioning are disclosed in currently pending co-owned U.S. patent application entitled "Auction-Based Advertising Including Consumer Solicited Ad Distribution" having U.S. Ser. No. 11/678,261, which is hereby incorporated by reference herein for all purposes.

Figure 3:
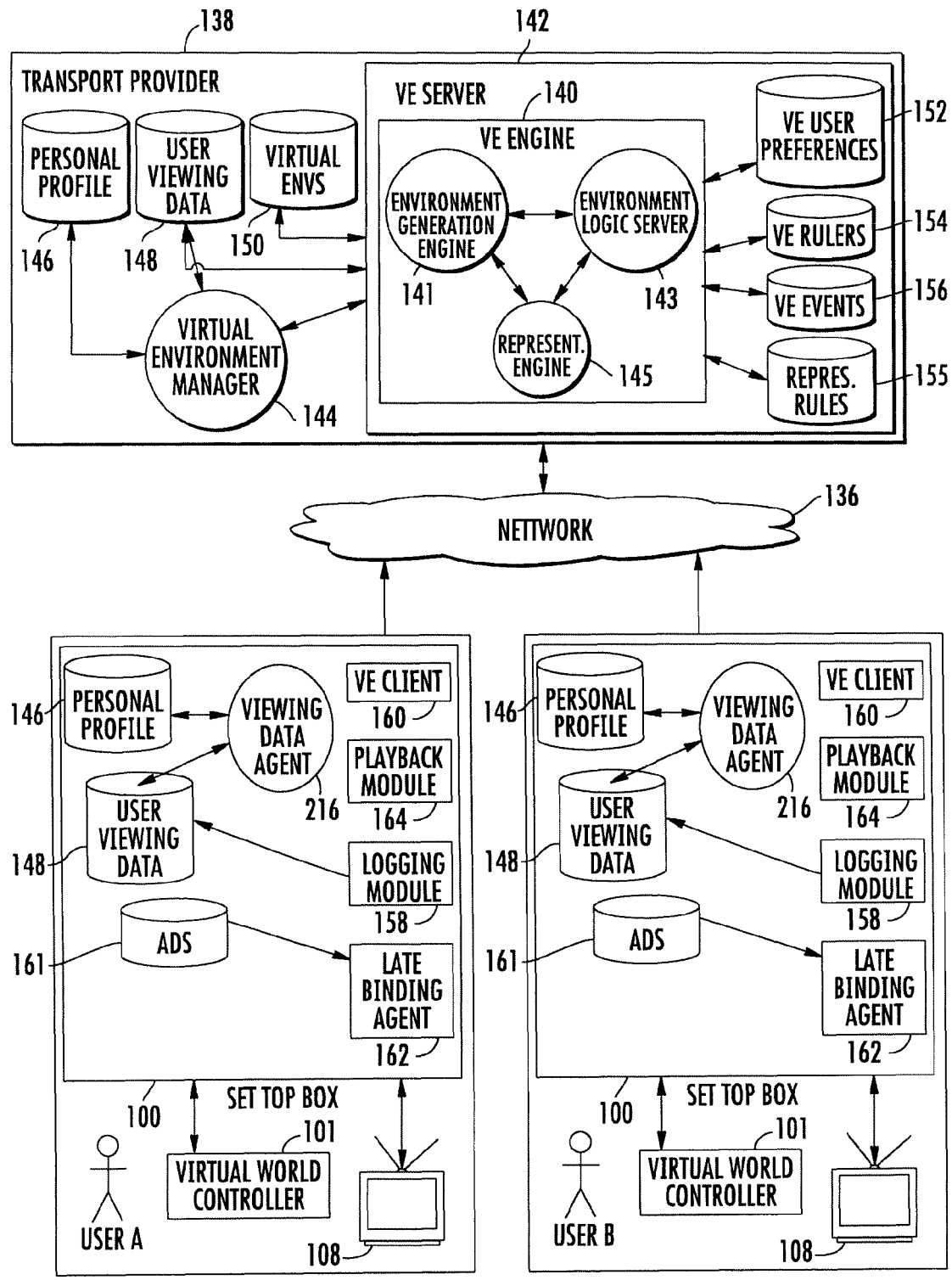
FIG. 3 illustrates a functional block diagram of a control system in the form of a virtual environment server and related components for implementing aspects of the presently disclosed functionality relative to one or more client devices associated with respective users participating in a virtual environment.

FIG. 3 illustrates aspects of a system that extends virtual world interaction and optional advertising beyond the confines of a given user and affords multiple users an opportunity to collaborate and interact within a virtual world environment. User interaction within the virtual world environment may sometimes be employed while advertisements (including traditional and/or virtual world advertisements) are presented. The present discussion relative to FIG. 3 is described with respect to the consumer-defined system of FIG. 2 based on set top box configurations. It should be appreciated that this is for exemplary purposes and should not unduly limit the collaborative aspects of the present technology to a set top box implementing consumer-defined advertising contexts. Any system in which multiple users may interact, such as with networked computer or gaming systems or other systems may utilize the subject technology to provide advertising in a shared virtual world environment.

With more particular reference to FIG. 3, a plurality of users may be communicatively linked together across a network 136. Users can include individuals, organizations, business entities, intermediate nodes or a combination of such entities, and should not be limiting to the present invention. Network 136 may correspond to the Internet in one embodiment. Network 136 may include any one or more networks over which data may be communicated, including but not limited to a dial-in network, a local area network (LAN), wide area network (WAN), public switched telephone network (PSTN), the Internet, intranet or other type(s) of networks. Network 136 may comprise any number and/or combination of hard-wired, wireless, or other communication links. Communication among users may occur over network 136, including but not limited to communications associated with sending and receiving invitations, exchanging shared advertising environments, exchanging shared advertisements and the like. Such communications are described herein in further detail in other portions of the specification.

Virtual world controller 101 represents any suitable hardware component or components that a user (or multiple users) can employ to interact with a virtual world environment and/or advertisement. For instance, controller 101 may comprise a remote control for set top box 100, an interface device such as a mouse, tablet, or game controller or an input feature associated with such devices as a set top box, personal video recorder, gaming device, internet appliance, media center, server, laptop, or other computer, a personal digital assistant (PDA), cellular telephone, music/video player and the like. The amount of interaction/control that may be exercised generally will depend on the capabilities of a given consumer's system, ad content and virtual world parameters, and the desire of the consumer to interact with, explore, or otherwise utilize the virtual world environment(s).

Display 108 may comprise any suitable display such as a conventional or high-definition television, flat panel display, projection display, computer monitor, LCD, or any other suitable display system of various type, resolution or capability which may or may not include audio capabilities. Set top box 100 may comprise any suitable computing device or devices that can be configured to select and provide video content such as television programming, advertisements, electronic programming guides, and the like. For instance, set top box 100 may comprise a cable box, personal video recorder, internet or media appliance, media player, or computing device.

As shown in FIG. 3, each set top box 100 associated with respective Users A and B comprises several components that are used to gather metadata and coordinate with a transport provider 138 to effectuate one or more shared virtual environments within which one or more networked users may participate. The system of FIG. 3 allows users to interact with each other in a virtual environment driven by TV ad slots (also referred to herein as time slots or advertising opportunities). In the example of FIG. 3, virtual environments (VEs) are executed and managed by a VE engine 140 located at the transport provider 138. VE engine 140 may also process representations, including host, content and presence representations as discussed in more detail herein. In other examples, one or more VE engines 140 are hosted and/or controlled by a third party. Additionally, the VE engines 140 may be implemented as a distributed system, such that the functionality afforded by VE engine 140 is effectuated by multiple users in a P2P network or other distributed configuration. In some embodiments of the present technology, virtual environments remain "active" at all times, and transport provider 138 may have multiple virtual environments active at any time. As such, multiple VE engines 140 may execute on a single VE server 142 and there may be multiple VE servers 142. Additional exemplary components within VE engine 140 may include an environment generation engine 141, an environment logic server 143 and a representation engine 145, more particular aspects of which will be discussed later in more detail.

Referring still to FIG. 3, a VE manager 144 may also reside at the transport provider system 138 and is responsible for the overall coordination of the virtual environments. Management functionality accomplished by VE manager 144 includes without limitation selection of the appropriate virtual environment, the appropriate engine and server, etc. The VE manager 144 may select one or more virtual environments for a given user by examining that user's preferences, metadata regarding the current content and upcoming ads along with other information, and matching such parameters associated with a viewing user to one or more parameters associated with the various virtual world environments. In some embodiments, VE Manager 144 may be configured to select one or more virtual environments based on selection instructions from one or more of the users participating or planning to participate in the environments. Again, it should be appreciated that the transport provider may have only one virtual environment into which all users are placed. However, provision of several different variations of virtual environments enables tailoring of an interactive advertising experience to a wider audience of users. The one or more virtual environments utilized in accordance with the present invention are typically up and running at all times, and may be stored in virtual environment database 150.

When multiple environments are available for a user to manually choose from or be automatically matched to, VE manager 144 first decides which VE(s) are the best match for the user. The system can utilize a wide range of information at its disposal, including but limited to one or more of user or viewer identifiers, user or viewer interests, user or viewer demographics, current time of day, day, month, or season, genre and/or rating of currently accessed media content or advertisements or currently available content, and user location. Users may correspond to entities associated with a respective system, and it should be appreciated that multiple viewers may use a set-top-box 100 associated with a given user. For example, the Jones household may be a user of set-top-box 100, but different members of the Jones household including mother, father and children may each be considered different respective viewers. Interests for users and/or viewers can include a vast number of possible options. For sake of example, interests may include without limitation parameters related to sports, online games, preferred stores or restaurants, travel locations, magazines or books, and any possible combination of other items identifying personal or business interests of a user. User and/or viewer demographics may include such factors as age, gender, income, family or marital status, sexual orientation, and others. Exemplary parameters related to location may include country, state, zip code, latitude/longitude coordinates as defined by a Global Positioning System (GPS) or other geographical identifier, or other defining parameter related to user location(s).

Referring still to FIG. 3, a plurality of databases may also be provided at the transport provider system 138. Such databases may be selectively associated with VE engine 140 or otherwise, and may include such databases as a personal profile database 146, a user viewing database 148, a virtual environment database 150, a VE user preference database 152, a VE rules database 154, a representation rules database 155 and a VE events database 156. Each database may correspond to one or more portions of computer-readable media provided at the depicted location or other accessible alternative location. In some embodiments, each database may comprise multiple databases. Databases may reside on hard drives, RAM, ROM, Flash or other memory devices or other suitable area for mid- to long-term storage and one or more buffers or queues for more immediate storage and retrieval of content and data. In some embodiments, selected ones of the multiple databases illustrated in FIG. 3 are actually combined into a single database. Databases illustrated as being provided respectively at a system associated with each user may alternatively be provided in a central location and accessible by multiple users.

As used herein, personal profile database 146 and user viewing database 148 are depicted in both the user's system (i.e., at set-top-box 100) and the transport provider system 138. For privacy and/or security concerns, such data could remain only at the user's location. Information stored in the user viewing database 148 includes any interaction a user has with the user's set-top-box. Such interaction is captured locally by a logging component 158 provided at set-top-box 100. Metadata corresponding to user interactions includes metadata relating to one or more of content viewing actions, past content selection, current content selection, future scheduled content selection, content preferences, advertising preferences, and advertisement viewing actions. Viewing actions during display of content or advertisements include such items as channel changes, ad views or skips, fast-forward, pause, rewind, volume change (up, down, mute, etc.), display mode selection such as picture-in-picture, split screen or the like, placement and content of such alternative picture-in-picture or other displays, and channel surfing activity such as time spent surfing, channels/shows previewed and channels/shows watched. Metadata related to past content selection may include such information as that related to programs watched, including title, genre, date/time of access, viewing duration, program duration, rating, level of interest, and the like. Other metadata regarding the user's viewing habits, previous recordings, and the like can be collected. Additional examples of metadata concerns aspects of a media content library, physical environment, and viewing schedules (or other future scheduled content selection identifiers for upcoming schedules and planned recording sessions). Media content libraries may relate to metadata regarding other content previously recorded and/or other content in a user's media library. Physical environment characteristics may relate to the display device(s) utilized, other devices involved, device capabilities, settings, other users present, audience identification characteristics (e.g., personal, small group, large group, friends, family, and the like), and setting preferences or identifiers associated with lighting, volume, devices involved, room dimensions (e.g., loud, personal, romantic, etc.) In some embodiments, the user has control over which content types can be collected.

As used herein, a content item being accessed by or available from a user may be a song, movie, television program, video clip, picture or the like. The content metadata may vary depending on the type of content item. For example, for each song, the content metadata may include the title of the song, the album on which the song was released, the artist of the song, the release date of the song, genre or classification, information defining the quality of the song such as the encoding parameters used to encode the content, and Digital Rights Management (DRM) or copyright restrictions. In addition, the content metadata may include availability or accessibility information reflecting a connection speed of the associated client device accessing or hosting the content, estimated download time, a reference or Uniform Resource Locator (URL) providing access to the associated content, and the like.

The VE user preferences database 152 stores user preferences for each respective user (viewing or hosting user) in a system. The user preferences may include, for example, one or more preferred types of content; one or more preferred genres such as one or more preferred music genres, movie genres, or television program genres; one or more preferred time periods; one or more other classifications of accessed or available content; one or more preferred artists such as one or more preferred music artists, actors, or actresses; one or more preferred acoustic styles; a preferred quality level or preferred range of quality levels; one or more preferred availability or accessibility parameters such as a preferred connection speed or estimated access or download time; a preferred quantity of content to be available from a host before a corresponding content representation is presented to the user; and preferred DRM or copyright restrictions parameters.

The VE rules database 154 stores content and rules required for the operation of a virtual environment. Representation rules database 155 stores graphics or information corresponding to the various types of representations implemented in the presently disclosed embodiments—including but not limited to host representations, content representations and presence representations. Various rules are provided to define when the various representations are applicable. As discussed in further detail below, representation rules database 155 is an ontology where each node in the ontology is a host, content and/or presence descriptor and is associated with one or more representations and one or more rules. The ontology including the nodes of the ontology, the representations associated with the nodes of the ontology, and the rules for the nodes of the ontology may be defined by an operator of the system (e.g., a viewing user or hosting user or combination of users), a system provider, transport provider, or a third party providing ontology information. Note that while an ontology is discussed herein, any other data structure such as a linked list, taxonomy, or the like may be used.

Events database 156 stores incoming user events from the client devices 160 at each user. The user events may be any user event permitted in the virtual environment. For example, the user event may be related to movement of the user's avatar within the virtual environment or entry and/or exit of the avatar into the virtual environment during different ad time slots. Referring still to FIG. 3, set-top-box 100 associated with each user may also include a VE client application 160 for managing the user interactions with the virtual environment and providing the display. This may be implemented as a virtual environment specific client (such as with "Second Life") or this may simply be a web browser. An ad database 161 may be provided for storing traditional or virtual world advertisements for viewing within a virtual world environment of the present invention. A late binding agent 162 executes on set-top-box 100 and is responsible for ad selection and insertion into media content being accessed by a user. Late binding agent 162 also provides the handoff to one or more virtual environments. Playback module 164 corresponds to circuitry/software directed by late binding agent 162 to mix content (not shown) with and one or more ads 161 for display on destination device 108. Content and/or ads may be stored locally or remotely, streamed or otherwise provided to the components including LBA 162 and playback module 164. Additional aspects pertaining to switching between accessed content and a virtual world environment, including advertisements for display therein, are provided in previously referenced U.S. Ser. No. 11/678,261 as well as currently pending co-owned U.S. patent application entitled "SYSTEMS AND METHODS OF PROVIDING COLLABORATIVE CONSUMER-CONTROLLED ADVERTISING ENVIRONMENTS" filed on Jun. 26, 2007 having U.S. Ser. No. 11/768,600, both of which are hereby incorporated by reference herein for all purposes With still further reference to FIG. 3, one particular exemplary embodiment of transport provider 138 and network 136 corresponds to a cable television (CATV) network encompassing switched digital video (SDV) circuits over a hybrid fiber coax (HFC) feeder network to a subscriber premise. These systems may use traditional CATV broadcast/VoD, or may use Internet Protocol Version 6 (IPv6) and Data Over Cable Service Interface Specification (DOCSIS) for delivery to a subscribing user. IPv6 unicast and multicast replaces the traditional broadcast/VoD CATV to give full featured Internet Protocol Television (IPTV) capabilities. Content encoding may include MPEG-2, H.264, or other compression technologies to conserve CATV network bandwidth. Other types of transport provider systems may include but are not limited to satellite systems, Fiber To The Premise (FTTP) systems, wireless systems such as WiFi, WiMAX, and the like, and Digital Subscriber Line (ADSL, VDSL, etc.) systems.

Additional description of the exemplary types of signaling technologies which may encompass aspects of the transport provider 138 and network 136 elements in FIG. 3 will now be discussed. It should be appreciated that additional details regarding such technologies may be appreciated by one of skill in the art and thus only a brief explanation of such options is presented herein. More particularly, CATV is method of distributing television channels from a centralized location (or headend) to a large number of subscribers (or viewers) such as Users A and B in FIG. 3. Such a CATV system uses tree and branch technology to fan out the signals through amplifiers and splitters in the network to reach viewers.

Switched Digital Video (SDV) is a connection based video transport service designed to operate over exiting cable networks. SDV has the ability to provide a video dial tone type of service to cable subscribers and is well suited for IPTV traffic as the payload. Utilizing individual circuits on the cable infrastructure, SDV may sometimes be better suited to manage bandwidth and guarantee quality of service to subscribers.

Hybrid Fiber Coax (HFC) is another exemplary type of broadband system for delivery of video and data to consumers. This type of network is normally deployed by cable TV operators and uses both fiber and coax in the feeder network between the cable TV headend and the customer premise. Optical and electrical splitters and amplifiers are used to duplicate and extend the signal as necessary. Return channels are provided for client command and control.

Internet Protocol Version 6 (IPv6) is the next version of IP routing capability replacing the IPv4 widely deployed on the Internet. IPv6 expands the current address space of 232 for IPv4 to 2128. Additional features of IPv6 relevant to this disclosure include expanded multicast capability.

Data Over Cable Service Interface Specification (DOCSIS) provides for high speed data transfer over existing CATV systems (specifically HFC systems). This standard defines operations and support to provide broadband internet access to subscribers of CATV networks.

A variety of signaling techniques and formats may also be employed by embodiments of the disclosed technology for providing media and other information over network 12. Such protocols may selectively involve multicasting, Internet Protocol Television (IPTV), Enhanced Television (ETV), Open Cable Application Platform (OCAP), Enhanced TV Binary Exchange Format (EBIF) and MPEG standards.

Multicast is a routing technology that allows a single host to transmit to multiple destinations on a network while utilizing a single connection to the entry switch or router. Multicast typically saves network bandwidth over unicast connects in large or continuous data transfers.

Internet Protocol Television (IPTV) is the use of IP based networking (such as the Internet) to deliver digital television or video in conjunction with other data based services. Typically the digital video is encoded using MPEG 2, MPEG4, H.264 or other video compression techniques to preserve network bandwidth. For broadcast services, IPTV can be multicast to further reduce network traffic. Typical TCP/IP or UDP/IP protocol stacks are used.

MPEG-4 Part 10, (H.264) is an advanced coding standard for video content capable of achieving very high compression rates. The standard provides good quality video at much lower bit rates than previous standards (such as MPEG-2). Additionally, much flexibility is allowed in selection of quality versus bit-rates, making the technology very suitable for IP based networks with bandwidth constraints. MPEG-2 is an older video compression standard that is widely deployed in CATV networks and set top boxes supporting standard and high definition formats.

Open Cable Application Platform (OCAP) is a middleware software specification for Set top boxes (STBs), PVRs, or other devices that terminate content to viewer from HFC or other CATV systems. The specification allows a boundary between the set top hardware and cable system to allow common applications to be developed for the viewer.

Enhanced Television (ETV) is a method to allow STB applications without full OCAP type capability. ETV is well suited to so called "thin client" STBs. However, an ETV application can run on an OCAP environment.

Enhanced TV Binary Exchange Format (EBIF) is a format specification for a resource file that will allow the delivery of an ETV application. An ETV user application decodes the resource file and presents the ETV application to the viewer.

Referring still to FIG. 3, at least one computing device associated with each user's system may correspond to a processor executing software running on a television set-top box (STB) 100. Although various examples herein describe use of the disclosed technology relative to a set-top box, the functionality provided by components within the set-top box 100 may be provided at any suitable hardware including, but not limited to, the set top box, a personalized video recorder, personal computer, multi-function multimedia center, home gateway router, dedicated computing device, and remote proxy server or client, and the like. In one particular exemplary embodiment, each subscribing user's system would include a set-top box (STB) 100 networked and managed via a Hybrid Fiber Coax (HFC) system. Open Cable Application Platform (OCAP), Enhanced Television (ETV), and Enhanced TV Binary Exchange Format (EBIF) are STB enabling technologies that may be used for the client application on each subscribing entity's system. In other exemplary embodiments, the playback client associated with each subscribing entity may include, but are not limited to, one or more of a Personal Computer (PC) or other display device implementing STB capability, a personal video recorder with direct or indirect HFC access, a portable real time video playback device (i.e. a device with wireless access to HFC type content), and the like.

Figure 4:
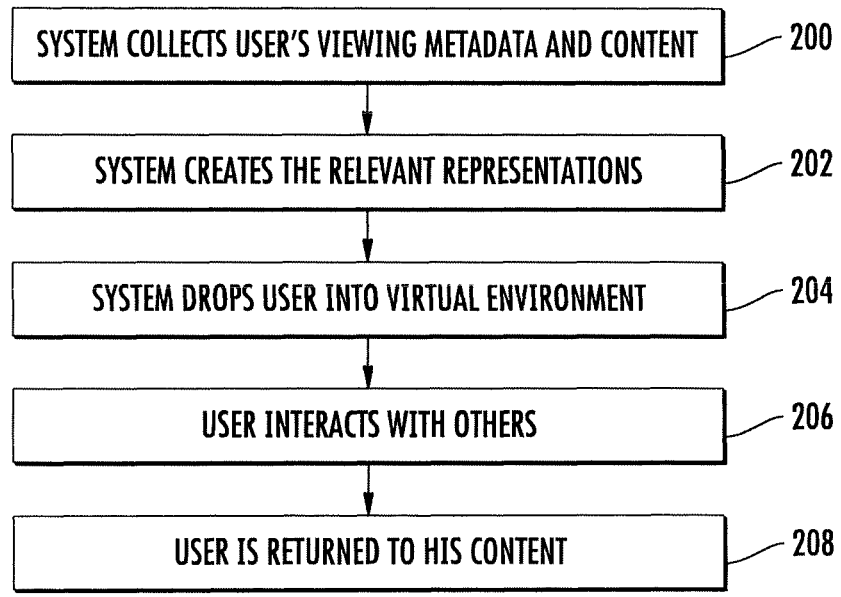
FIG. 4 illustrates a flow chart of exemplary steps related to a process of facilitating user interaction within a virtual environment according to one embodiment of the present invention.

FIG. 4 presents a flow chart of exemplary steps and functionality afforded by the control systems of the present invention. A method of coordinating user presence and interaction within a virtual environment may include a first step 200 in which the subject system collects or obtains one or more user's viewing metadata and content. A second step 202 corresponds to the control system creating relevant representations, including host, presence and/or content representations. A user is then presented into a virtual environment with applicable representations available to other participating users in step 204. The user interacts with other users in step 206, and is then returned to accessed content in step 208.

Figure 5:
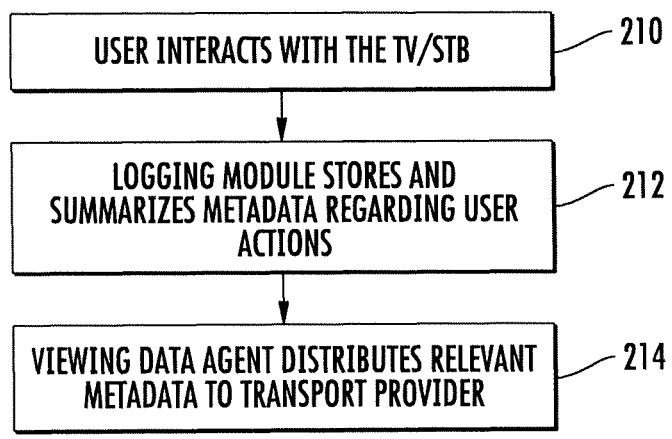
FIG. 5 illustrates a flow chart of exemplary steps related to a process of collecting user viewing metadata and content according to one embodiment of the present invention.

More particular details pertaining to step 200 will now be described with reference to FIG. 5. It should be appreciated that the various representations described herein are based on metadata associated with various parameters. For example, host representations (e.g., an avatar representing a given user) may be driven based on personal preferences associated with a viewing or hosting user. A viewing user may specify how he wants the host representations of other users to look or a hosting user may specify how he wants his representation to appear to others. Content representations may be driven based on metadata regarding a user's past, current and future content viewing activities. As previously discussed, this data is collected by a logging module 158 provided on a user's set-top-box 100. The collected data may then be stored in the User Viewing Data database 148. FIG. 5 provides a flowchart depicting the main processes involved with capturing a user's viewing activity or other aspects of content access.

Referring now to FIG. 5, a first step 210 associated with a process for capturing user viewing or content access data involves allowing user interaction with a television, set-top-box or other client device or control system. Step 212 involves the logging module storing and summarizing metadata regarding user actions and presence. Step 214 concerns the viewing data agent distributing relevant metadata to the transport provider. More particular aspects of such steps 212 and 214 will now be discussed.

With partial reference to the interactive system of FIG. 3, a viewing data agent 216 located at a user's set-top-box 100 is responsible for sending viewing metadata to the transport provider system 138. Alternatively, the VE manager 144 at a transport provider system 138 can request for updates/additions to a user's metadata. In one embodiment, the agent 216 periodically summarizes the local data collected and creates summary entries into the user viewing data database 148. For example, viewing data agent 216 may, on a daily or other periodic basis, examine all of the programs watched for the day and create or update a summary entry representing that activity. For example, the summary entry for programs watched may contain the duration for each genre type involved. It is this summary data that is sent to the transport provider 138 in step 214 of FIG. 5. The method and degree to which detailed entries are combined and summarized is variable. A factor to consider is that the level of summary activity performed in steps 212 and 214 ultimately affects the performance of representation engine 145, the load on the overall VE engine 140, and the amount of data that has to be sent.

The load or performance impacts associated with steps 212 and 214 and others on the network 138 and local system are straightforward. The impact to the representation engine 145 may be more subtle. For example, suppose the transport provider 138 has a high-powered, advanced version of a representation engine 145. If a viewing data agent 216 collapses thousands of detailed records into a simple summary record, the representation engine 145 may not provide much value. Conversely, if there is a weak version of representation engine 145 and the viewing data agent 148 sends every detail record, the system may become impaired. Thus, a balance should be established between the capabilities and performance of the representation engine 145 with the summarization activities of the viewing data agent 216.

In FIG. 5, the viewing data agent 216 sends updates to the transport provider in step 214. The Virtual Environment Manager 144 at transport provider 138 can intercept these updates and provide additional filtering or summarization or the updates can pass directly to the databases. The viewing data agent 216 is configured to send updates periodically (hourly, daily, etc.) as configured by the user. When the user is actively involved in virtual environments, certain actions or updates may be sent immediately if they may have an effect on the user's presence in the virtual environment. For example, if the system detects that the user has left the room (in a virtual or physical sense), that information can be sent immediately to the transport provider. This allows the virtual environment to more immediately reflect that change in the user's representations.

In an alternate embodiment the content metadata classification associated with steps 212 and 214 of FIG. 5 can take place on the user's home environment, thus addressing privacy concerns. In that system, a third party sends an ontology, predicates and a scoring algorithm to the target system. The target system executes the queries and calculations and computes a score for nodes in the ontology. Only the ontology with related scores is returned to the third party. In embodiments of the present technology, the third party would generally correspond to transport provider 138. Additional details regarding this alternative approach for gathering metadata associated with content access and viewing are disclosed in currently pending co-owned U.S. patent application entitled "Methods, Systems, and Products for Characterizing Target Systems" having U.S. Ser. No. 11/359,632, which is hereby incorporated by reference herein for all purposes.

Referring again to FIGS. 3 and 4, step 202 corresponds to a control system creating relevant representations, including one or more of a host representation, content representations and presence representations. In general, representation engine 145 in FIG. 3 creates visual representations based on a set of metadata regarding a host, content accessed or available from a host, and host presence within a virtual environment. A representation is created from a collection of graphics that are mapped to an ontology based on relevant metadata. More particular details pertaining to the creation of such representations will now be discussed with reference to FIGS. 3 and 6.

VE engine 140 and other engines or agents of the present technology may be implemented in software, hardware or a combination thereof. In general, VE engine 140 operates to provide a client-specific view of the virtual environment to client devices associated with various users based on user events received from the client devices. VE engine 140 may provide a client-specific view by either providing the image itself and/or providing necessary data to construct a display of the view. VE engine 140 includes an environment generation engine 141, an environment logic server 143 and a representation engine 145. Although illustrated as part of the VE engine 140, it should be appreciated that the representation engine 145 may exist outside of the context of the VE engine 140. In such alternative embodiment, the output of the representation engine 145 would then be made accessible to the VE engine 140. Using the VE content and rules database 154, the environment logic server 143 and environment generation engine 141 operate to process user events from VE client devices associated with each user. Using representation rules database 155, representation engine 145 interacts with environment logic server 143 and the environment generation engine 141 to effect presentation of content representations within a virtual environment according to the present invention.

Figure 6:
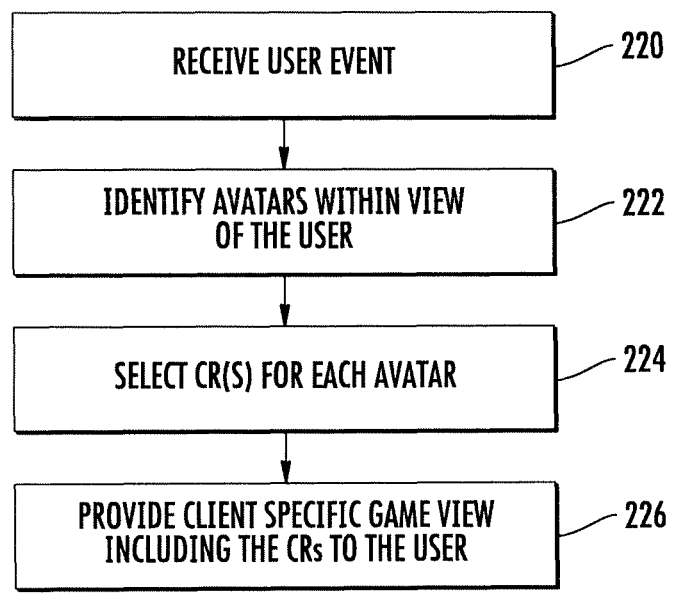
FIG. 6 illustrates a flow chart of exemplary steps related to the operation of the virtual environment server depicted in FIG. 3 according to one embodiment of the present invention.

FIG. 6 illustrates the operation of the VE engine 140 and particularly the operation of the representation engine 145 to effect presentation of host, content and presence representations in a virtual environment. First, the VE engine 140 receives a user event (step 220). For this example, assume that the user event relates to entry of a hosting user into the virtual environment, such as by the hosting user's arrival at an ad time slot. Additional events, such as exiting from a virtual environment, moving within a virtual environment, or the like, may trigger the event receipt of step 220.

Figure 7B:
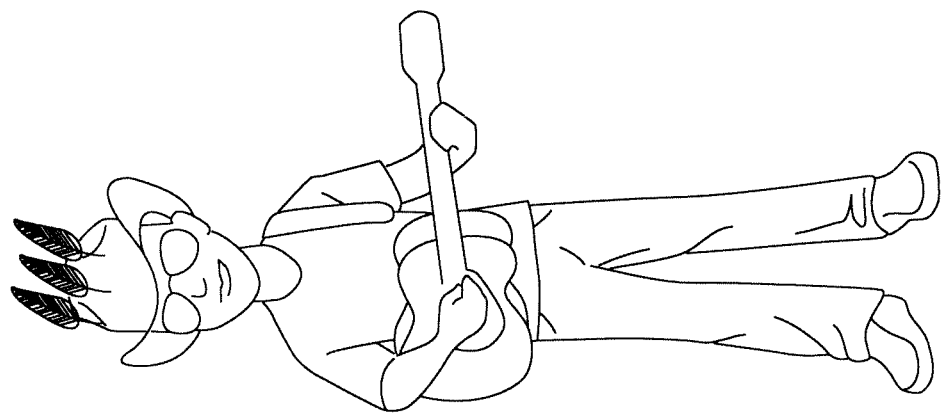
FIGS. 7A and 7B illustrate an exemplary avatar wherein filtering is applied to the content representations based on the user preferences of two different users according to one embodiment of the present invention.
Figure 7A:
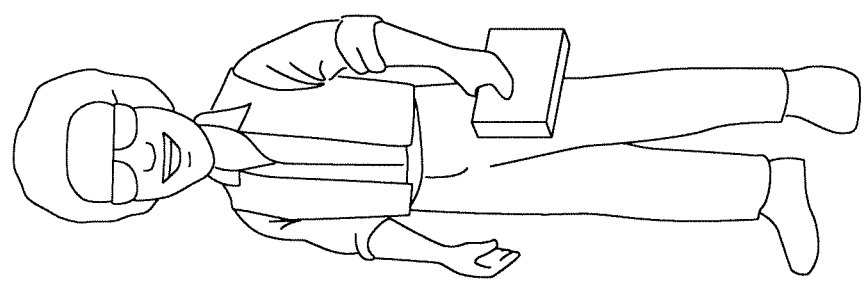

At this point, representation engine 145 identifies in step 222 the avatars for hosting users within the view of a viewing user. In step 224, representation engine 145 then selects one or more host representations for the viewing and hosting users within the view of the viewing user. As previously mentioned, the basic host representation display may be an avatar or other visual element presented based on predefined user preferences. FIGS. 7A and 7B illustrate an exemplary avatar where the applicable representations, including host and content representations have been filtered by representation engine 145 according to user preferences of two different viewers according to one embodiment of the present invention. As discussed above, once the representation engine 145 has identified the representations that are applicable to a hosting user, the representation engine 145 may filter the applicable representations based on the user preferences of the viewing user. For example, FIG. 7A illustrates an exemplary avatar of a hosting user after filtering based on the user preferences of a first viewing user. FIG. 7B illustrates the same avatar after filtering based on the user preferences of a second viewing user. Such differences in filtering and viewing may equally apply to other types of representations than host representations—namely, to presence and content representations as well. Thus, the representations presented in association with the same avatar may be different in the view of the virtual environment provided to the first viewing user and the view of the virtual environment provided to the second viewing user.

At this point, the representation engine 145 selects one or more representations to be presented in the virtual environment for a given viewing user. For each hosting user within the view of the viewing user, respective representations may include a host representation, such as an avatar, in conjunction with one or more content representations or presence representations. Note that while only the view of a given viewing user is discussed for clarity and ease of discussion, the representation engine 145 may also select one or more representations to be presented in association with the viewing user relative for the client view of another user.

Representation engine 145 first processes the content metadata describing the content accessed by or available from a hosting user based on the representation rules from the representation rules database 155 to determine which representations are applicable to the content accessed or made available by a hosting user. The representation content and rules database 155 may include an ontology providing a defined set of representations. Each node in the ontology corresponds to a descriptor such as, for example, historical content preference (genre or the like) based on actual usage data, upcoming schedule, ad profile, currently accessed content or content available from the viewing user, current viewing settings, content viewing habits, viewing device or other environment characteristic, and ad virtual environment engagement (e.g., the types of interactions or lack of interaction performed by the user in a given virtual environment). Each node has one or more representations and one or more rules defining when the representation(s) for the node are applicable. Again, while an ontology is discussed herein, any other data structure such as a linked list, taxonomy, or the like may be used.

In one example, different ontologies can be used to represent such different facets of user content access. In other examples, different ontologies may be utilized based on the virtual environment. For example, if the virtual environment is sports-related, an ontology heavily populated with representations that have a sports angle would be ideal. Users may also have control over which content metadata is utilized for which virtual environment. User defined profiles can be utilized to influence how representations are created and also which types of representations are displayed for each virtual environment.

Figure 8:
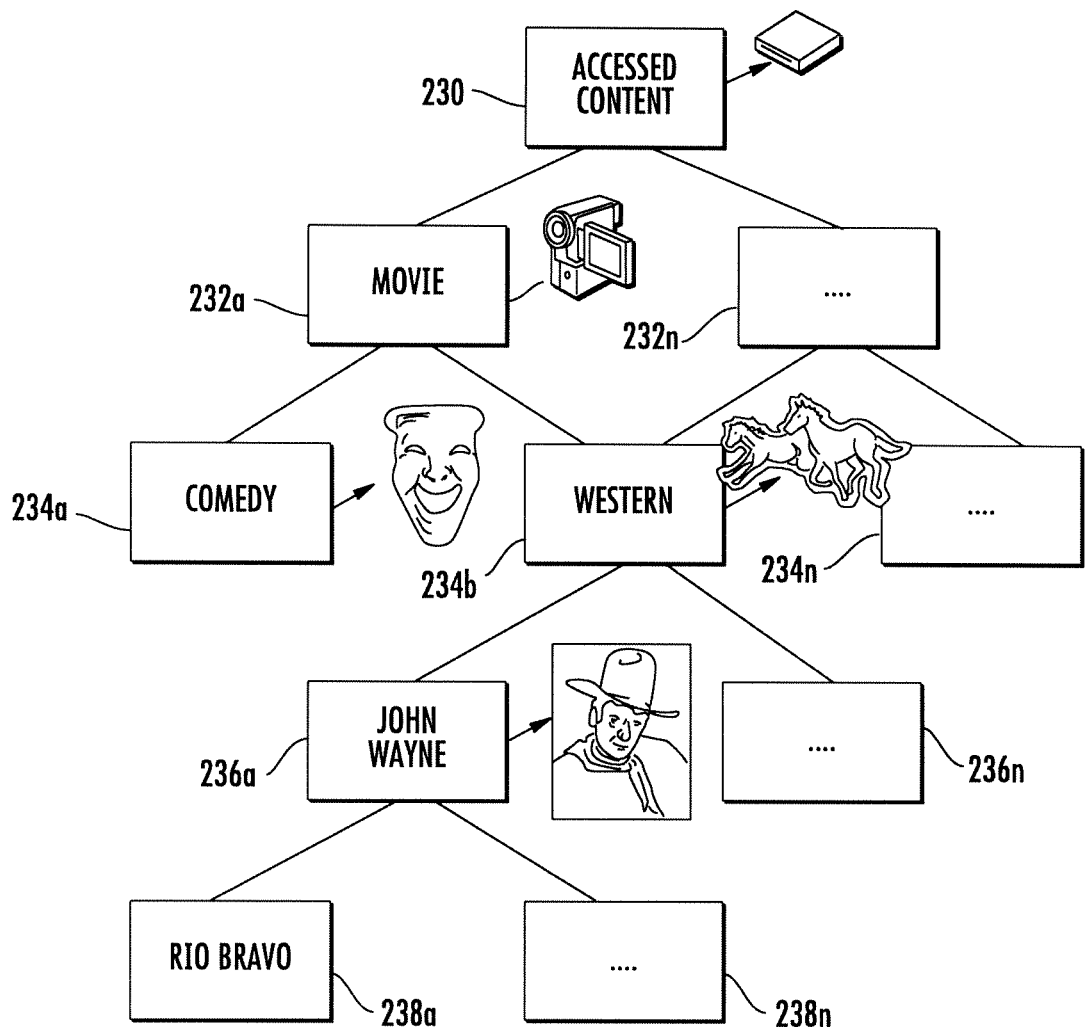
FIG. 8 illustrates an exemplary ontology defining content representations according to one embodiment of the present invention.

An exemplary ontology is illustrated in FIG. 8. Note that the exemplary ontology of FIG. 8 is for illustrative purposes only and is not intended to limit the scope of the present invention. Also, the example of FIG. 8 concerns an exemplary ontology for content representations, although it should be appreciated that similar arrangements may apply to host and presence representations and others. As illustrated, the ontology may include an "accessed content" node 230, a first group of one or more nodes 232a, ..., 232n describing content type such as a "movie" node 230a, a second group of one or more nodes 234a, ..., 234n describing genre type such as a "comedy" node 234a and a "western" node 234b, a third group of nodes 236a, ..., 236n describing movie actors such as a "John Wayne" node 236a, and a fourth group of nodes 238a, ..., 238n describing movie selections and the like such as a "Rio Bravo" node 238a. Each of the nodes has one or more associated content representations that are indicative of the corresponding node in the ontology. Using this ontology, the content metadata for the user may be processed to determine which of the content representations are applicable to the content being viewed by the given user. In a particular example, a higher level content representation consistent with node 234*b* provides a horse representing "Western" movie genre and may indicate that a given user is scheduled to watch two western movies in the next week. By interacting with this content representation, a user may determine more detail regarding one or more of the movies. He may progress down the ontology, perhaps to a "John Wayne" node 236*a* and then finally to the name of the movie "Rio Bravo" that the user is scheduled to watch. Alternatively, the content representations representing the user's schedule may have an option to launch a pop-up display showing an entire viewing schedule. In order to determine which ontological nodes are applicable, a scoring scheme may be used as previously discussed.

Note that the process of determining which representations are applicable to the content accessed by a viewing user may occur in response to a user event (such as the user entering a virtual environment) or at some previous point in time. For example, the representation engine 145 may determine which representations are applicable when the a given viewer's future viewing schedule is updated with changes, additions or the like.

Returning to FIG. 6, once the representation engine 145 has determined which of the representations are applicable to a given hosting user, the representation engine determines or selects which of the applicable representations are to be presented in association with the host representation of a user. In one embodiment, if the number of applicable content representations is small, all of the applicable content representations may be selected for presentation in the view of the viewing user. In another embodiment, the user preferences of the viewing user may be used to filter the applicable content representations. For example, if the preferred movie genre of the user is Westerns and the applicable content representations include a Western representation, a Comedy representation and an Animation representation, the representation engine 145 may filter the applicable representations such that only the Western's representation is presented in association with the avatar of a hosting user in the view of the viewing user.

In addition to or as an alternative to filtering, the representation engine 145 may use a layering technique based on, for example, a distance indicia providing either a relative distance between avatars of the various users in a virtual environment, or a relative distance between the hosting and the viewing user. The relative distance between the hosting user and the viewing user may be, for example, a physical distance between the users, a number of hops between the users in a network, logical hops between the users in a network, logical hops between the users in an overlay network, a distance between the users in a social network, or the like. When the avatars of the users are relatively far apart, a high level content representation may be selected for presentation. As the distance between the avatars of two users in the virtual environment then decreases to a predetermined threshold, the representation engine 145 may select a new representation at a lower level or finer resolution. Lower level representations may apply to each of the host, content or presence representations as desired by a viewing user.

Once the one or more representations are selected by the representation engine 145, the representation engine 145 interacts with the environment generation engine 141 to effect presentation of the selected representations in association with the host representation of a hosting user in the client view of a viewing user (step 226 of FIG. 6). Note that the client view may be provided by providing the objects in the view of the viewing user or by providing metadata or other information describing or identifying the objects and the locations of the objects in the view of the user. Thereafter, based on the content representations, the user can easily determine whether content accessed by the other hosting users is of interest. If so, the user may, for example, interact with the other user to form a social network or contact or may obtain accessed or available content or initiate a process for obtaining desired content.

Additional details regarding the formation of content representations is disclosed in currently pending co-owned U.S. patent application entitled "System and Method for Representing Content", filed on Feb. 26, 2007 and assigned U.S. Ser. No. 11/678,781, which is hereby incorporated by reference herein for all purposes.

Figure 9:
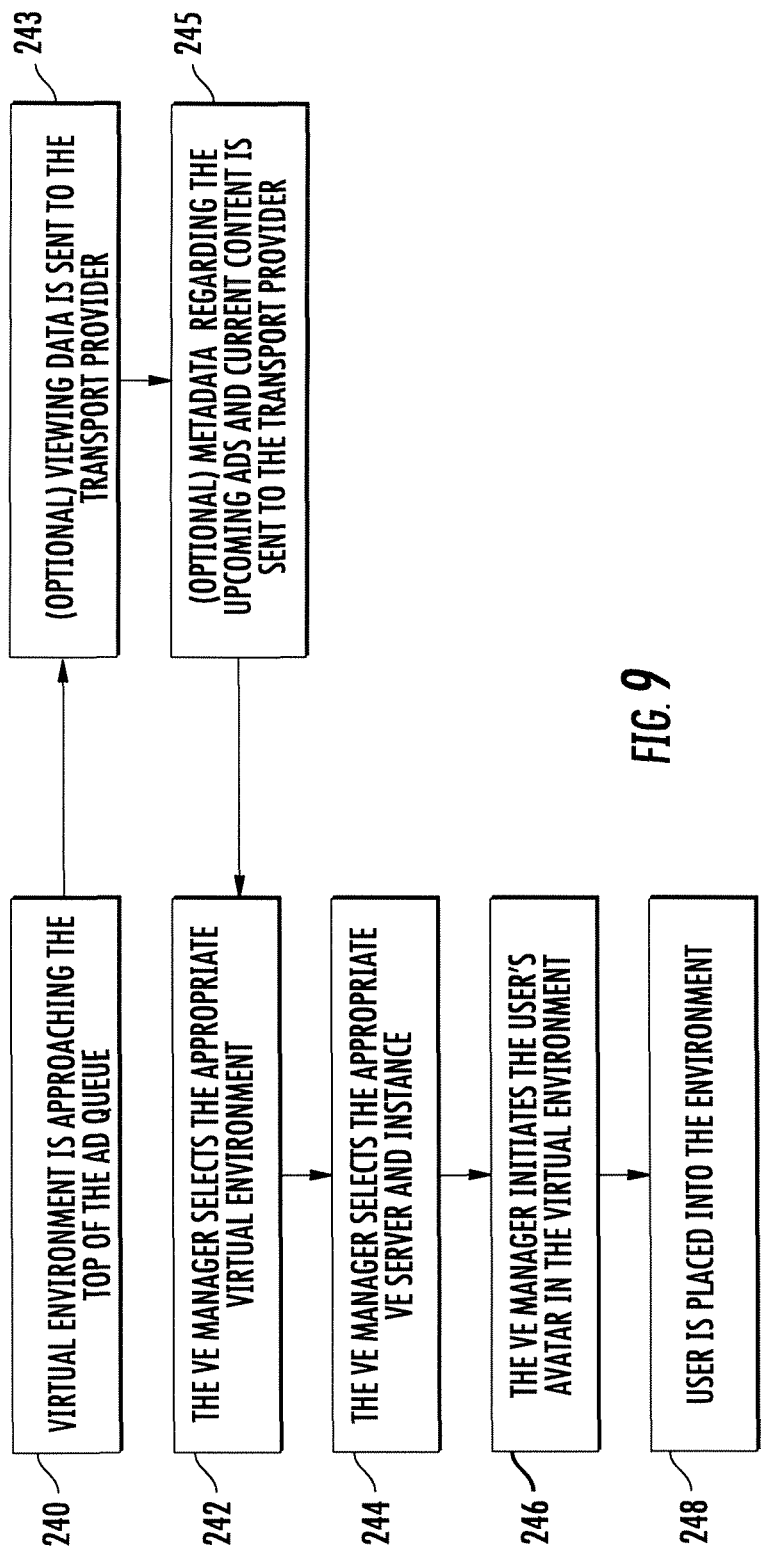
FIG. 9 illustrates a flow chart of exemplary steps related to inserting a user into a virtual environment according to one embodiment of the present invention.

Referring again to FIG. 4, after the subject system creates relevant representations for a hosting user and associated accessed or available content, such hosting user is dropped into a virtual environment in step 204. FIG. 9 represents the high level activities involved in the process of placing a user into a virtual environment. In accordance with the present technology, users are placed into a virtual environment when ad time slots are present between content access. As such, the system monitors a user's content access to determine when a time slot is approaching. This may correspond in one example to a determination in step 240 of when a virtual environment ad is approaching the top of an ad queue associated with a viewing user. Again, the ads may be coming from the user's local ad queue or from the transport provider. In either case, the late binding agent (LBA) 162 at the viewing user's system is aware of the upcoming ads. The LBA 162 determines that the VE ad is almost to the top of the prioritized ad queue. The LBA 162 may receive information from the transport provider about upcoming ads. Also, the LBA 162 may look ahead into the video stream to determine the upcoming ads. In any event, once the LBA 162 is aware of the upcoming VE ad, the system readies itself for playback of the ad. It does this by first ensuring all relevant data is sent from the home system to the transport provider. Next, the VE Manager 144 chooses the appropriate virtual environment in step 242 and readies the user's avatar or other host representation in the environment. Finally, at the appropriate time the LBA 162 switches the user to the virtual environment display. Details regarding these actions follow.

The system makes sure that the latest up to date viewing data has been sent to the transport provider system 138. First, the LBA 162 sends a message to the Viewing Data agent 216 to update the viewing data (step 243 of FIG. 9). If the data has recently been sent, there may not be a need to send the data again. Next, the LBA 162 sends data regarding the current content and the upcoming ad to the transport provider 138 (step 245 of FIG. 9). It may be that the transport provider 138 already has this information and the LBA 162 is aware no additional data needs to be sent. Finally, LBA 162 sends a message to VE Manager 144 to initiate the virtual environment.

The VE Manager 144 examines the user preferences, metadata regarding the current content and upcoming ads along with other information to determine which virtual environment the user should be launched into. As previously mentioned, VE Manager 144 can utilize a wide range of information, depending on what metadata is obtained for a given user. Examples include parameters associated with other users in a virtual environment, user or viewer identifiers, user or viewer demographics, user or viewer interests, current time of day, month, day, season, genre or rating of media content, user location and others. When metadata regarding other users in a virtual environment is used to select a VE for a given user, the system is attempting to match "like" users within a virtual environment. The term "like" users is used to indicate users with similar interests, demographics, etc. In one example, the system may be configured with a default setting whereby a higher priority is given to other viewers that are part of the current user's social network. Other pre-existing groupings of users may also be taken into account. For example, if a user belongs to a viewing group for synchronized viewing, those users are placed together in the virtual environment. In some examples, a first option for selecting a virtual environment does not involve complicated matching of preferences, but matching to a preceding environment, such as one in which a given user participated during the most recent prior ad time slot.

In some embodiments, a transport provider 138 may have multiple instances of the same virtual environment executing for performance and usability reasons. If that is the case for the selected virtual environment, the system then determines which instance the current user is placed into by utilizing various load balancing schemes as are well known in the art. Once the instance has been selected, the system needs to determine exactly where to place the user into the environment. It would not often be practical, or usable, to place everyone into the same location within a virtual environment, as this would limit interactivity among users. In one example, the system determines where to place a user by analyzing the users with the virtual environment instance and placing the user near "like" users. Users could be placed in one of multiple user configurations of a predetermined size, such as three to five like users per group. Again, for returning users, the user can be returned to the location where the user left off from a prior instance of the virtual environment.

With further reference to FIG. 9, the LBA 162 finally initiates the VE Client 160 (if necessary) and switches the display to that of the virtual environment when an ad time slot arrives. Additional details for switching control of the display from the video stream to the virtual environment were discussed with reference to FIG. 2 and are also described in previously referenced U.S. Ser. No. 11/678,261. VE Manager 144 then selects an appropriate VE server 142 in step 244 as well as an appropriate instance of a virtual environment, at which point the selected VE server 142 initiates the user's host representation (e.g., avatar) in the virtual environment instance in step 246. The user is then placed into the virtual environment in step 248. Each of the generated content representations and presence representations (or selected applicable representations based on user filtering) is presented alongside the user's host representation in the virtual environment or is otherwise incorporated with the host representation.

Referring again to FIG. 4, step 206 of the present technology involves user interaction with other users in a virtual environment. As mentioned previously, user interactions within this type of environment may be brief and sporadic. Such a scenario is unique relative to traditional interactions within virtual worlds that include chatting, making gestures, etc. In this system, several features and approaches are provided to facilitate such interactions. First, as described above, a number of content and/or presence representations are created and presented alongside each user's avatar or other host representation. Content representations enable a user to more quickly determine which user(s) he would like to interact with. For example, a given user may notice a specific content representation for the television show "The Office" next to a nearby user. Such a content representation may indicate the nearby user is currently watching "The Office" or alternatively has episodes of "The Office" stored at his client device. The given user may want to approach the nearby user and suggest they form a viewing group for the next showing of "The Office". Depending on the level of interaction desired by a given user, presence representations are designed to help the given user know how much time another user expects to be present within a virtual environment.

Specific interaction capabilities include but are not limited to the following, which will be described in more detail below: (a) Examine viewer's upcoming schedule; (b) Preview current content; (c) Automated matching of users based on schedule, preferences, etc.; (d) Specific features enabled; and (e) Retaining user presence.

Additional discussion will now be presented relating to exemplary interactions involving examination of a viewer's upcoming schedule. As mentioned previously, users are able to interact with a content representation depicting a user's schedule in at least two ways. The user can select a quick view of the entire upcoming schedule. This popup display of the user's upcoming schedule is generated based on the data sent from the set-top-box 100. Alternatively, based on that same data, a content representation can be "navigated". This means that the user can drill down to lower and lower levels of detail. This type of interaction is described in more detail in currently pending co-owned U.S. patent application entitled "Interactive Content Representations Enabling Content Sharing" filed on Feb. 26, 2007 and having U.S. Ser. No. 11/678,813, which is hereby incorporated by reference herein for all purposes. The interaction can be tailored to the specific activity, in this case examining a viewing schedule. A viewing schedule with varying degrees of granularity may be displayed. For example, a top level content representation may indicate that a user likes to watch "educational shows", drilling down to the next week may display a content representation indicating that for the particular week, the educational shows focus on history. This type of drilling down continues to a specific timeline showing schedule information for the next predetermined period of time. This may be displayed by a horizontal sequence of content representations overlaid on a timeline or other visual representation(s).

Additional discussion will now be presented relating to exemplary interactions involving previewing current content. A content representation is provided to represent what the user is currently watching. The content representation may be very high level and generic or may be very specific to the content. For example, FIGS. 10A and 10B provide two different content representations for a user currently watching a baseball game between the Red Sox and the Yankees. In FIG. 10A, a more high level content representation of a television with a baseball diamond indicates that the user is watching television, and is particularly watching a sports channel or a baseball game. In FIG. 10B, the content representation is more specific to the content being accessed by the user and is intended to relay that the user is watching not just any baseball game, but a game between the Boston Red Sox and the New York Yankees. In addition to the content representations identifying the content being accessed, there may be additional content representations depicting actions available relative to the content or the user accessing the content. In the example of FIG. 10B, the "eye" 250 represents the user's ability to preview the content, the group of users 252 depicts the viewing group feature or alternatively that the user is part of a viewing user's social network, and the lock 254 indicates the content cannot be copied. These are just a few examples of what may be presented and how the features/attributes could be visually represented.

Based on a content representation, a user may wish to see a preview of what the other user is watching. In this case, the user may want to find out the score of the game and the current inning. To enable this, a set top box must be able and configured to record the current content. In this case, a running copy of the last minute of the content is saved. One of the optional steps in this process is for copying current content up to the transport provider. Alternatively, the content can remain on the user's system and access is made in a P2P fashion. With this content available from either the transport provider or the user's system, other users in the virtual environment would be able to select the content representation and view the content or a portion thereof.

Additional discussion will now be presented relating to exemplary interactions involving automated matching of users based on schedule, preferences, etc. Users can configure the system to highlight users based on a number of criteria. Users can select from any of the available parameters regarding user preferences, viewing history, current content, etc. Any users that match the criteria may then be highlighted in some fashion. For example, a graphic may be placed above the matching avatars for matching users. Avatars may be shaded or color-coded depending on matched parameters. Users can specify that certain matching parameters are always active. This means that the system will constantly search for and highlight the matching users. Alternatively, the user may want to specify matching criteria for a one-time search. This type of user matching and highlighting is utilized to enable functionality such as creating viewing groups which is described below.

Additional discussion will now be presented relating to exemplary interactions involving enablement of specific features. Certain features specific to TV-watching, social networking, ad configuration, etc. may be associated with content or host representations. Specific content representation types may have specific features available. For example, a "current content" representation may have the "preview content" feature enabled. Other examples of features that may be implemented in association with a representation include without limitation creating a viewing group (from a schedule-based content representation the user may want to initiate a viewing group during ad time slots), locate viewers in your social network (thus providing the ability for a user to quickly ascertain the location of friends and family in the virtual environment), provide feedback on the virtual environment (a user would be able to approve/disapprove of the virtual environment selection, request to join another virtual environment, etc.), preview the user's current content, or modify representation settings.

Another specific feature that may be implemented in accordance with aspects of the present technology corresponds to the basic delivery of advertisements within a virtual environment. Ads may be delivered in many fashions, including but not limited to coming as part of content broadcast and/or being auctioned by an ad auctioning agent. The ads may be narrowcasted to the consumer's STB in real time or they may be queued in a local data store. When multiple users are involved in a virtual environment, there are multiple ways for the advertiser to "drive" ad playback. One method would be to have multiple advertisements within the virtual environment and place users in proximity of the ad that is best matched to a user, similar to the type of matching that may occur in deciding which virtual environment within which to place a given user. Another method would be to "sponsor" a location within a virtual world and give more freedom for users to move around, explore and interact. In such sponsoring method, ads may include logos, company colors, interactive games involving a product, a virtual world store, song or other audio background related to a product, and the like. Finally, users could be placed in a collaborative virtual environment such as a beach, park, club or other environment, with advertisements playing in the background, placed on objects in the environment or the like.

With more particular regard to the option of creating a viewing group during ad time slots, it should be appreciated that coordination may occur among multiple playback devices (associated with one or more different users) during playback of homogeneous or heterogeneous content. A viewing group may involve coordinated rendering of a shared virtual environment among multiple users or among a plurality of playback devices associated with one or more users. Such coordination may be effected by receiving schedule information identifying content played by the plurality of playback devices, and then coordinating advertisement presentation opportunities (i.e., ad time slots) in the content played by the plurality of playback devices. The shared virtual environment would then be accessible by the plurality of playback devices for rendering during the coordinated advertisement presentation opportunities. When content viewed at multiple playback devices is heterogeneous in nature, a virtual group of playback devices or users of the playback devices may be formed and managed by a virtual group (VG) control function as disclosed in currently pending co-owned U.S. patent application entitled "Coordinating Advertisements at Multiple Playback Devices" filed Mar. 20, 2007 and having U.S. Ser. No. 11/688,404, which is hereby incorporated by reference herein for all purposes. In one embodiment, the VG control function is hosted by a central node communicatively coupled to the playback devices via a Personal Area Network (PAN), Local Area Network (LAN), Wide Area Network (WAN), or the like or any combination thereof. In operation, the VG control function operates to coordinate advertisement time slots in heterogeneous content being played by the playback devices and provide targeted advertisements to the playback devices for insertion into the coordinated advertisement slots. Coordinated advertisement slots may correspond alternatively or additionally to immersion of one or more users into a given virtual environment(s) as discussed in accordance with the present technology, where coordinated targeted advertisements may optionally be displayed.

Figure 11:
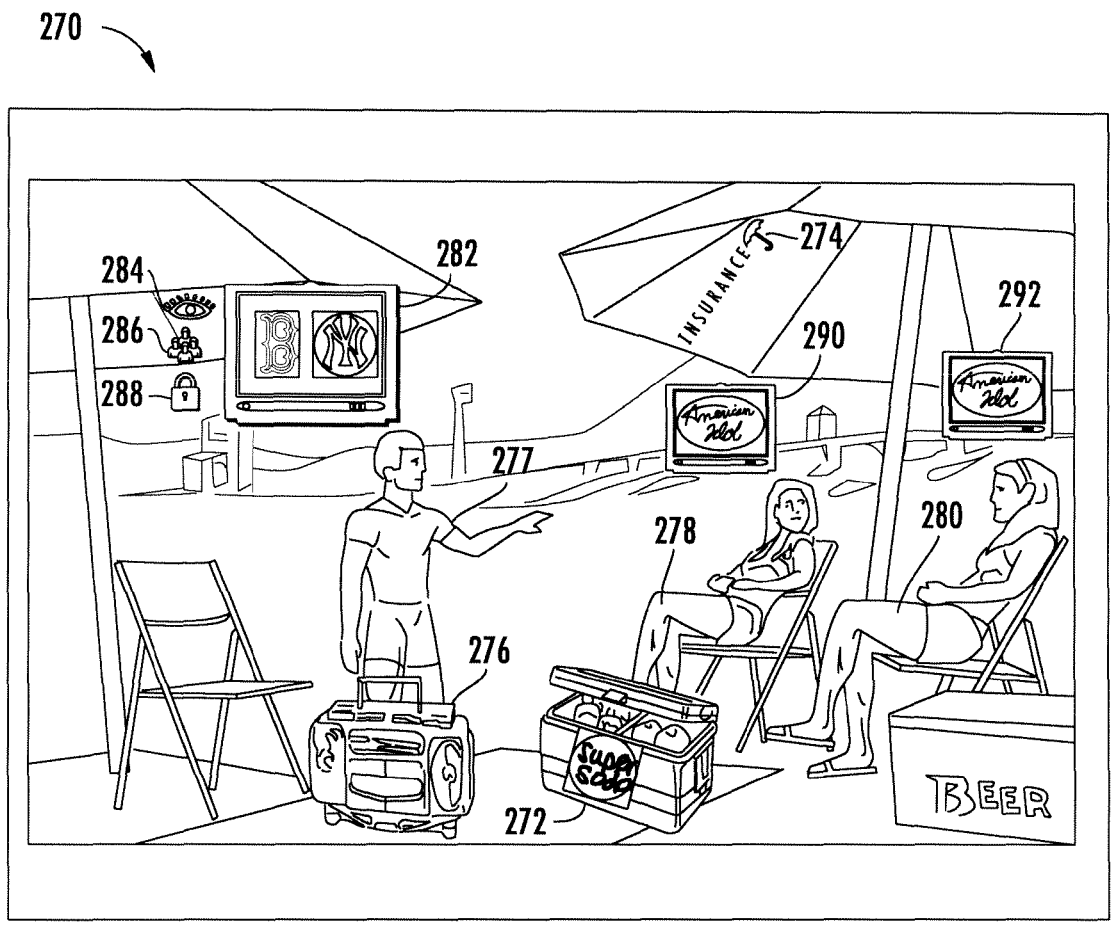
FIG. 11 illustrates a viewing user's view of a virtual environment, including a view of host and content representations as well as advertisements within the virtual environment according to one embodiment of the present invention.

Many of the examples described herein have utilized the collaborative scenario for illustrative purposes, although it should be appreciated that any type of advertising interaction may be employed. For example, in FIG. 11, three users are placed in a virtual beach environment 270. Multiple advertisements are implemented visually, including a first graphic advertisement 272 for a hypothetical softdrink called "Super-Soda" and a second graphic advertisement 274 for an insurance company. A third advertisement incorporated into the virtual beach environment may correspond to an audio advertisement playing on radio 276. Additional features in accordance with the present subject matter depicted in FIG. 11 include respective host representations (in this example, avatars) 277, 278 and 280 for each of three users. First avatar 277 is associated with additional content representations, including representation 282 indicating that the first user associated with avatar 277 is currently watching a baseball game between the Boston Red Sox and the New York Yankees. Representation 284 indicates that a viewing user may preview the baseball game content being accessed. Representation 286 indicates that a group of users is currently accessing or is capable of accessing the baseball game content. Representation 284 indicates that the baseball game content cannot be copied. Content representations 290 and 292 indicate that the users associated with respective avatars 278 and 280 are watching the television program "American Idol".

A still further specific feature that may be implemented in accordance with aspects of the present technology corresponds to providing a presence representation or other feature for retaining user presence within a virtual environment. It should be appreciated that users are active in these virtual environments for a much shorter time than in traditional virtual environments such as online virtual worlds and games. In order to complete interactions that were started, there needs to be a mechanism to retain a user's presence even as he is returned to his content. This system provides several options for the user regarding user presence. By default, when a user is returned to his viewing session, his avatar remains in the virtual environment for a configurable amount of time. The avatar may be "ghosted-out" to indicate that the user is no longer active in the environment. The ghosting-out may be accomplished by graying out the avatar or other color highlighting, leaving only an outline, placing a graphic next to the avatar, or any similar mechanism. In some examples, a user may be returned to his content viewing session while simultaneously maintaining a view of the virtual world in a split screen, picture-in-picture or other type of dual display format. It may be the case in such examples that such a user's avatar is ghosted-out or has some other presence representation indicating his status as having returned to a viewing session. However, the user would still be able to view the interaction of other users in the virtual environment while accessing viewing content.

Figure 12:
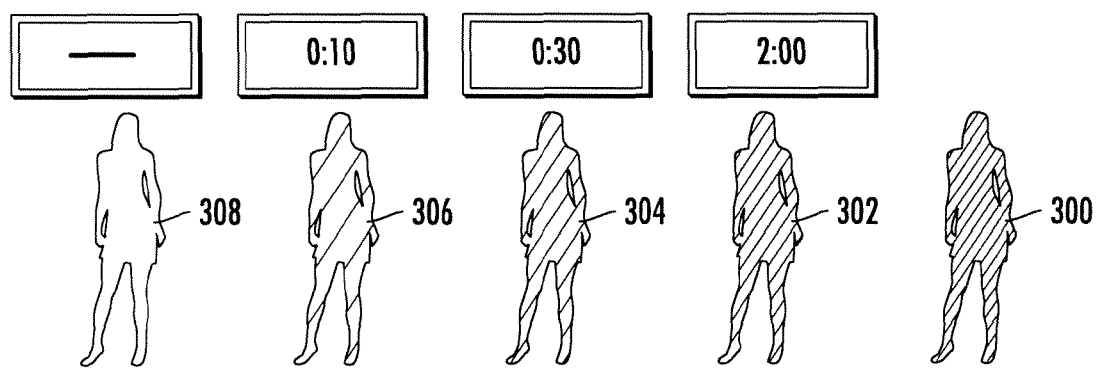
FIG. 12 illustrates a series of exemplary presence representations according to one embodiment of the present invention.

FIG. 12 provides one example of how a user's presence representation may be implemented in accordance with aspects of the present technology. As just mentioned, presence representations may be incorporated with a user's host representation, such as by manipulating the color or shading of a user's avatar. In FIG. 12, different avatar shadings or colors could represent a given user's presence availability within a shared virtual environment relative to an ad slot. So if a user is within an ad slot such that they are currently present in a given virtual world, their avatar may be represented in a solid state such as avatar 300. If a user has returned to his accessed content, meaning an ad time slot has expired, that user's avatar may remain, but in a ghosted-out state such as avatar 308. These two simple states may exist, or a number of intermediate presence representations may be utilized. For example, it may be beneficial for other users in a virtual environment to be aware not only of user presence and absence, but of an estimated time left during which the user expects to be present. For example, a first visual element 302 has an intermediate shading representing that a user associated with avatar 302 has two minutes left until the end of his current ad time slot. Second visual element 304 indicates that a user associated with such avatar only has thirty seconds left until the end of his current ad time slot. Visual element 306 indicates that user associated with such avatar only has ten seconds left until the end of his current ad time slot. Visual element 308 indicates that the user associated with such avatar has returned to regularly accessed content. Of course, different periods of time and numbers of different shading representations may be utilized as an infinite combination of such representations is possible. As an alternative to a presence representation incorporated as shading into a user's avatar, a presence representation may be placed next to a user's avatar. In some examples, such presence representations may correspond to certain preselected symbols. In another example of FIG. 12, a presence representation may correspond to a time clock indicating the amount of time left until the end of a user's ad time slot, or until the user's expected return to regularly accessed content. When a user is fading out, such as in representations 302, 304 and 306, interactions may still occur. However, some interactions may only be available if the user is present. For example, suggesting to join a viewing group may be disabled if the user has faded from the environment. As an extension of the above presence representation descriptions, it should be appreciated that in alternative embodiments, a user's avatar can begin to fill-in as the next ad slot approaches. For example, one visual element or time clock could indicate that a user has two minutes remaining until the next ad slot, that the user just returned to a program and has fifteen minutes left until the next ad slot, or just started watching a movie with no commercial breaks and expects to be unavailable from a virtual world for two hours or more.

After a user's time in a given ad slot is done, thus completing a user's instance within a virtual environment, a user is typically returned to the user's accessed content (such as in step 208 of FIG. 4.) When just a few seconds of ad time remain, the system may present the user the ability to remain in the virtual world. There is an opportunity for an advertiser to "sponsor" the user return graphic and display a product related image or graphic that allows the user to remain in the virtual environment. If the user does nothing, he will be returned to the original video stream. If the user chooses to stay, he will remain in the virtual world until selecting an option to return to the video. The system (likely the set top box 100 or similar device) is responsible for switching the primary display playback to the original video stream. When the user chooses to stay in the virtual world past the allotted ad time, the system may automatically begin to record the original video stream (if necessary). Once the user returns, he will be able to see the original video content in its entirety. Additionally, as described above, the user's presence may remain in the virtual world for a period of time.

It should be appreciated that the unique environments of the present technology open up additional possibilities concerning interactions between a television and virtual environment. The two distinct worlds of television viewing and virtual environment interaction can be intertwined and linked in multiple ways. For example, a viewing user does not need to see a content representation representing what that viewing user is currently watching. Instead the system could display, in a picture-in-picture mechanism, the actual content that he was watching. While the program is in ad time, a snapshot of the last image can remain. If the user chooses to remain in the virtual world beyond the ad time slot, the video stream of the content could be displayed in place of a static content representation, such as illustrated in the representation of FIG. 10C. In this case, the baseball game is ongoing while the viewing user remains in the virtual environment. The viewing user sees the game playing out, while the view for the other users is simply the static content representation.

In another example, suppose that active users in the virtual environment want to interact with a user who has returned to his content. An active user could send a message to the "ghosted-out" user. The message may be displayed as a picture-in-picture display or overlaid on his program.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A control system comprising at least one computing device adapted to:
   render a shared virtual environment to a viewing user, wherein the shared virtual environment is also accessible by at least one hosting user;
   determine at least one advertisement time slot in a media broadcast accessed by a given hosting user, wherein the given hosting user is capable of being present within the shared virtual environment during the at least one advertisement time slot in the media broadcast and the media broadcast is separate from the shared virtual environment; and
   identify a content representation that is indicative of content associated with the given hosting user; and
   effect presentation to a viewing user of the content representation in association with a host representation representing the given hosting user.

2. The system of claim 1, wherein the content representation provides an indication of estimated remaining time within the at least one advertisement time slot.

3. The system of claim 1, wherein the content representation provides an indication of estimated time remaining until the given hosting user enters the shared virtual environment.

4. The system of claim 1, wherein the content representation comprises a visual element selected from a plurality of visual elements, wherein the plurality of visual elements comprises at least one visual element indicating user absence from the shared virtual environment and a plurality of visual elements indicating user presence within the shared virtual environment for different estimated periods of time.

5. The system of claim 1, wherein said at least one computing device is further adapted to execute at least one virtual advertisement in the shared virtual environment.

6. The system of claim 1, wherein said at least one computing device is further adapted to select the virtual environment rendered to the viewing user, and wherein said selecting comprises choosing a virtual environment with one or more virtual parameters that are matched to at least one parameter associated with the viewing user.

7. The system of claim 6, wherein the one or more virtual environment parameters that are matched to at least one parameter associated with the viewing user comprise one or more of user identifiers, user demographics, user interests, viewer identifiers, viewer demographics, viewer interests, current time of day, current month or day, current season of the year, genre of current media content, rating of current media content, and user location.

8. The system of claim 1, wherein said at least one computing device is further configured to:
   determine an advertisement presentation opportunity; and
   execute at least one advertisement in the shared virtual environment.

9. The system of claim 8, wherein the at least one advertisement comprises a virtual advertisement.

10. The system of claim 1, wherein effecting presentation of the content representation comprises:
    filtering one or more of the host representation and the content representation based on user preferences of the viewing user to provide filtered content representations; and
    effecting presentation of at least one of the filtered representations to the viewing user.

11. The system of claim 1, wherein the host representation is an avatar representing the given hosting user in the shared virtual environment, and effecting presentation of the content representation comprises effecting presentation of the content representation in association with the avatar within a view of the shared virtual environment presented to the viewing user.

12. The system of claim 11, wherein the content representation is a visual element presented alongside the avatar within the view of the shared virtual environment presented to the viewing user.

13. The system of claim 1, wherein one or more of the host representation and the content representation is further descriptive of content available from a hosting user.

14. The system of claim 1, wherein one or more of the host representation and the content representation is descriptive of the current content being accessed by a hosting user.

15. The system of claim 1, wherein one or more of the content representation host and the content representation is descriptive of a future schedule for accessing content associated with a hosting user.

16. The system of claim 1, wherein said at least one computing device is further adapted to receive a content transfer initiation event from a client device of the viewing user for initiating transfer of at least a portion of content currently accessed by the hosting user; and
    in response to the content transfer initiation event, effecting transfer of the at least a portion of the content currently accessed by the hosting user to the client device of the viewing user.

17. The system of claim 1, wherein said at least one computing device is further adapted to receive a content transfer initiation event from a client device of the viewing user for initiating transfer of at least a portion of content available from the hosting user; and
    in response to the content transfer initiation event, effecting transfer of the at least a portion of the content available from the hosting user to the client device of the viewing user.

18. The system of claim 1, wherein one or more of the host representation and the content representation is descriptive of time remaining for the given hosting user to be present within the shared virtual environment.

19. The system of claim 1, wherein one or more of the host representation and the content representation comprises a buffered display of at least a portion of content currently accessed by the hosting user.

20. The system of claim 1, wherein one or more of the host representation and the content representation is descriptive of the hosting user's social network status relative to the viewing user.

21. The system of claim 1, wherein said control system comprises a server coupled over a network to a client device associated with the viewing user and a client device associated with the hosting user.

22. The system of claim 1, wherein said control system comprises one or more client devices associated with one or more of the viewing and hosting users and other networked users adapted to operate in a distributed configuration.

23. A control system comprising at least one computing device adapted to:
    render a shared virtual environment to a viewing user, wherein the shared virtual environment is also accessible by at least one hosting user;
    determine at least one advertisement slot in a media broadcast accessed by a given hosting user, wherein the given hosting user is capable of being present within the shared virtual environment during the at least one advertisement slot in the media broadcast and the media broadcast is separate from the shared virtual environment; and identify a content representation that is indicative of content associated with the given hosting user; and effect presentation to a viewing user of the content representation in association with a host representation representing the given hosting user.

24. The system of claim 1, wherein the media broadcast is a television broadcast.

25. The system of claim 23, wherein said at least one computing device is further adapted to coordinate rendering of the shared virtual environment on a plurality of playback devices by:

receiving from the plurality of playback devices schedule information identifying content played by the plurality of playback devices; and coordinating advertisement presentation opportunities in the content played by the plurality of playback devices, wherein the shared virtual environment is accessible by the plurality of playback devices for access rendering during the coordinated advertisement presentation opportunities.

26. A method comprising:

rendering a shared virtual environment to a viewing user, wherein the shared virtual environment is also accessible by at least one hosting user;

determining at least one advertisement time slot in a media broadcast accessed by a given hosting user, wherein the given hosting user is capable of being present within the shared virtual environment during the at least one advertisement time slot in the media broadcast and the media broadcast is separate from the shared virtual environment; and identifying a content representation that is indicative of content associated with the given hosting user; and effecting presentation to a viewing user of the content representation in association with a host representation representing the given hosting user.

\* \* \* \* \*